United States Patent
Kuboi et al.

(10) Patent No.: US 9,411,914 B2
(45) Date of Patent: Aug. 9, 2016

(54) SIMULATOR, PROCESSING SYSTEM, DAMAGE EVALUATION METHOD AND DAMAGE EVALUATION PROGRAM

(75) Inventors: Nobuyuki Kuboi, Kanagawa (JP); Tetsuya Tatsumi, Kanagawa (JP)

(73) Assignee: Sony Corporation, Tokyo (JP)

( * ) Notice: Subject to any disclaimer, the term of this patent is extended or adjusted under 35 U.S.C. 154(b) by 697 days.

(21) Appl. No.: 13/323,373

(22) Filed: Dec. 12, 2011

(65) Prior Publication Data
US 2012/0158379 A1    Jun. 21, 2012

(30) Foreign Application Priority Data
Dec. 21, 2010   (JP) ................. 2010-284130

(51) Int. Cl.
*G06F 7/60* (2006.01)
*G06F 17/10* (2006.01)
*G06F 17/50* (2006.01)

(52) U.S. Cl.
CPC ........ *G06F 17/5009* (2013.01); *G06F 2217/16* (2013.01)

(58) Field of Classification Search
CPC . G06F 17/50; G06F 17/5009; G06F 17/5018; G06F 2217/16; H01L 21/2236; H01L 21/31116; H01L 21/32137
See application file for complete search history.

(56) References Cited

U.S. PATENT DOCUMENTS

| 6,009,255 A * | 12/1999 | Shinzawa ................... 703/6 |
| 2009/0162950 A1 * | 6/2009 | Kuboi et al. ................ 438/5 |
| 2010/0178757 A1 * | 7/2010 | Kusaka et al. .............. 438/514 |
| 2010/0243431 A1 * | 9/2010 | Kuboi et al. ............ 204/192.33 |

FOREIGN PATENT DOCUMENTS

| JP | 07-115071 | 5/1995 |
| JP | 2010-232594 | 10/2010 |

OTHER PUBLICATIONS

Ertl et al., Three-Dimensional Plasma Etching Simulation using Advanced Ray Tracing and Level Set Techniques, ECS Transactions, 23 (1) 61-68 (2009).*

Kokkoris et al., Simulation of SiO2 and Si feature etching for microelectronics and microelectromechanical systems fabrication: A combined simulator coupling modules of surface etching, local flux calculation, and profile evolution, J. Vac. Sci. Technol. A 22(4), Jul./Aug. 2004.*

Luisier, Mathieu, Andreas Schenk, and Wolfgang Fichtner. "Three-dimensional full-band simulations of Si nanowire transistors." Electron Devices Meeting, 2006. IEDM'06. International. IEEE, 2006.*

* cited by examiner

*Primary Examiner* — Aniss Chad
(74) *Attorney, Agent, or Firm* — Chip Law Group

(57) ABSTRACT

Disclosed herein is a simulator including: an input section adapted to acquire processing conditions for a given process performed on a workpiece; and a damage calculation section adapted to acquire the damage of the workpiece, based on the processing conditions, by calculating, using a Flux method, the relationship between the amount of a first substance externally injected onto a given evaluation point on the workpiece during the given process and the amount of a second substance released from the given evaluation point on the workpiece as a result of the injection of the first substance.

17 Claims, 23 Drawing Sheets

TEM IMAGE

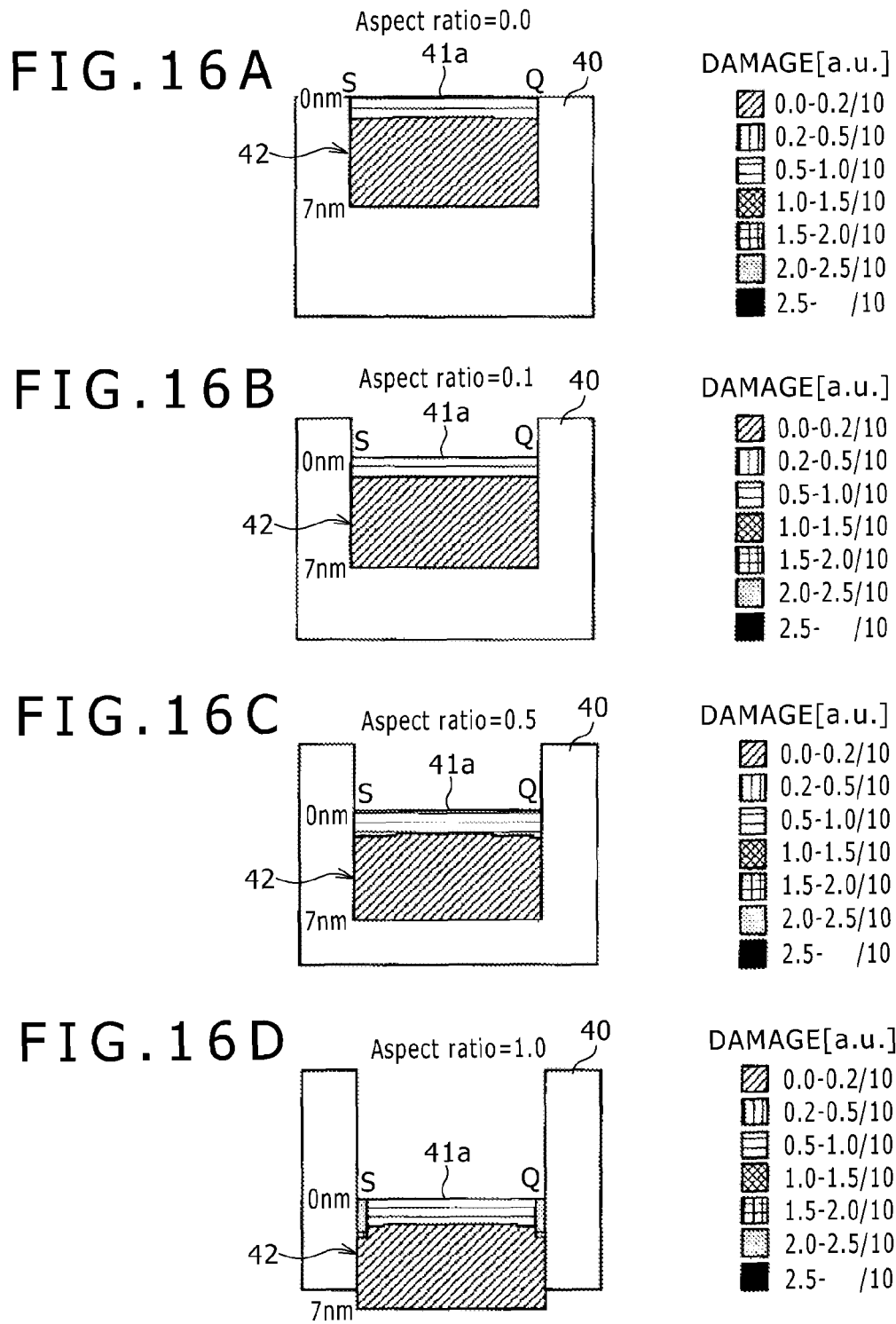

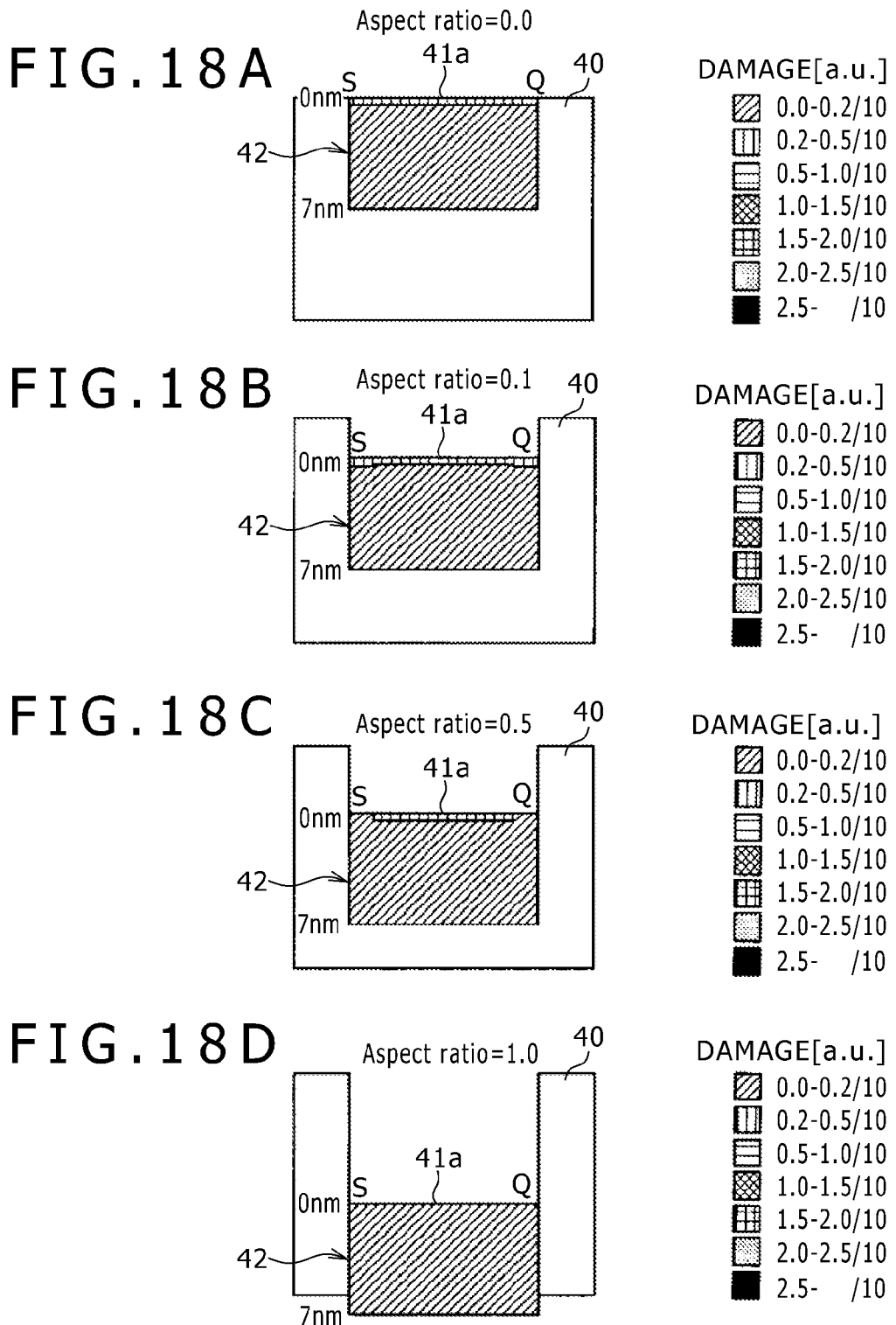

2

SIMULATOR, PROCESSING SYSTEM, DAMAGE EVALUATION METHOD AND DAMAGE EVALUATION PROGRAM

BACKGROUND

The present disclosure relates to a simulator for evaluating the damage sustained by a workpiece when a given process is performed on the workpiece, a processing system having the same, damage evaluation method and damage evaluation program.

If a process such as etching, PVD (Physical Vapor Deposition) or ion implantation is performed on a film to be processed in the device manufacturing process, the processed film is damaged (e.g., crystal defects in the processed film) by ion injection. It has been indicated that this damage significantly affects the electrical characteristics of the device. As a result, it has become an important challenge for the device manufacturers to solve this problem immediately.

However, it is difficult to directly measure a real pattern of damage distribution with measuring devices available today. In order to consider in detail the relation between the condition of ion injection during the process and the electrical characteristics of the device, countermeasures against the above problem and other factors, and improve the electrical characteristics of the device, therefore, it is necessary to develop a damage distribution prediction technique (evaluation technique) using simulation.

In related art, therefore, a variety of simulation techniques have been proposed that can evaluate the condition when ions are injected into a target film (refer, for example, to Japanese Patent Laid-Open Nos. Hei 7-115071 and 2010-232594 (hereinafter referred to as Patent Documents 1 and 2, respectively), J. F. Ziegler, J. P. Biersack and U. Littmark: "The Stopping and Range of Ions in Solids," Pergamon Press, New York, 1985 (Non-Patent Document 1, hereinafter) and Kawase and Hamaguchi: Dry Process Symposium 2005 (Non-Patent Document 2, hereinafter)).

Patent Document 1 proposes an ion implantation simulation technique, and Non-Patent Document 1 an SRIM (Stopping and Range of Ions in Matter) simulation technique. These simulation techniques allow, for example, for prediction of the ion penetration depth in a target film having an amorphous structure. However, it is difficult for these techniques to quantitatively express crystal defects (e.g., crystal lattice disorder in polysilicon or silicon oxide) that occur as a result of ion penetration in consideration of the crystal structure of the target film.

Non-Patent Document 2 proposes a simulation technique using a molecular dynamics simulator. This simulation technique can predict a crystal lattice disorder in atomic or molecular level, for example, according to the incident ion energy, incidence angle, target film type and so on in consideration of interaction between incident ions and atoms making up the target film.

With the simulation technique proposed in Non-Patent Document 2, however, the amount of calculations is enormous, resulting in an extremely long calculation time. For example, if the damage distribution is calculated by applying this simulation technique to a real pattern, it is only possible to calculate the damage distribution of an extremely limited area sized about several nm by several nm in a practical calculation time (e.g., within about several weeks). Further, this simulation technique leads to an even longer calculation time if the incident ion mass is small (e.g., hydrogen ion) because of a long flying distance of the incident ions in the film. In practically calculating the damage distribution of a target film using a molecular dynamics simulator, therefore, the damage distribution of the target film is calculated by ignoring the processing pattern and assuming that the target film is flat due to these calculation time restrictions.

On the other hand, Patent Document 2 proposes a technique as an extension of the simulation technique described in Non-Patent Document 2. More specifically, the damage distribution of a workpiece is found in advance under a variety of conditions by calculating the behavior of incident particles (ion particles) in the film based on molecular dynamics, followed by preparation of a database in which the found damage distribution data is stored. In practically predicting a real pattern of damage distribution by simulation, the position of collision of the incident particles onto the workpiece and the incidence angle are calculated first using the Monte Carlo method in consideration of the transportation route in the real pattern of the incident particles. Next, the database is searched based on the calculated position of collision of the incident particles and the incidence angle to find the corresponding damage distribution. This technique eliminates the need to perform molecular dynamics calculations every simulation run, thus contributing to reduced calculation time.

SUMMARY

As described above, the simulation technique proposed in Patent Document 2 provides, for example, faster damage distribution calculation than the technique using a molecular dynamics simulator proposed in Non-Patent Document 2 and so on.

It should be noted, however, that a database necessary for the calculations is prepared by molecular dynamics calculations. As a result, it takes time to prepare the database. In particular, if incident particles are, for example, light particles such as hydrogen, and if their energy is high, their flying distance is long in the film, thus resulting in longer time to prepare the database.

In the technique described in Patent Document 2, on the other hand, the transportation route in a real pattern of incident particles is calculated using the Monte Carlo method. As a result, a number of particles are necessary to calculate, with high accuracy, the distribution of incidence angles of incident particles to the pattern opening and the collision position distribution on the side walls and bottom of the pattern. In this case, the actual calculation time per calculation step is long in time evolution calculations.

As described above, the various simulation techniques in the past have significant restrictions in terms of their calculation times, thus making it difficult to calculate the damage sustained by a workpiece as a result of ion injection in a short period of time. At present, therefore, the development of a new damage calculation technique is sought after to solve the above problems.

In light of the foregoing, it is desirable to provide a simulator, processing system, damage evaluation method and damage evaluation program using a calculation technique that can calculate, in a short period of time, the damage sustained by a workpiece in a process such as ion injection.

According to an embodiment of the present disclosure, there is provided a simulator that includes an input section and damage calculation section. The input section acquires processing conditions for a given process performed on a workpiece. The damage calculation section acquires the damage of the workpiece based on the processing conditions. It should be noted that the damage of the workpiece acquired at this time is acquired by calculating, using the Flux method, the relationship between the amount of a first substance externally injected onto a given evaluation point on the workpiece during a given process and the amount of a second substance released from the given evaluation point on the workpiece as a result of the injection of the first substance.

Further, a processing system according to another embodiment of the present disclosure includes a processing section, the simulator according to the present disclosure and a control section. The processing section performs a given process on a workpiece. The control section corrects processing conditions for the given process based on the damage of the workpiece acquired from the simulator.

Still further, in a damage evaluation method and damage evaluation program according to further embodiment of the present disclosure, processing conditions for a given process performed on a workpiece are acquired. Next, the damage of the workpiece is acquired based on the acquired processing conditions. It should be noted that, at this time, the damage of the workpiece is acquired that can be acquired by calculating, using the Flux method, the relationship between the amount of a first substance externally injected onto a given evaluation point on the workpiece during a given process and the amount of a second substance released from the given evaluation point on the workpiece as a result of the injection of the first substance.

As described above, the present disclosure evaluates (predicts) the damage distribution during a given process performed on a workpiece using the damage calculated by the Flux method. The Flux method provides a significantly reduced amount of calculations as compared to the calculation methods used in related art including the molecular dynamics calculation method. Therefore, the present disclosure allows for calculation of the damage sustained by a workpiece in a given process such as ion injection in a shorter period of time.

BRIEF DESCRIPTION OF THE DRAWINGS

FIGS. 16A to 16D are diagrams illustrating the results of evaluation example 5;

FIGS. 18A to 18D are diagrams illustrating the results of evaluation example 5;

DETAILED DESCRIPTION OF THE PREFERRED EMBODIMENTS

Figure 1:
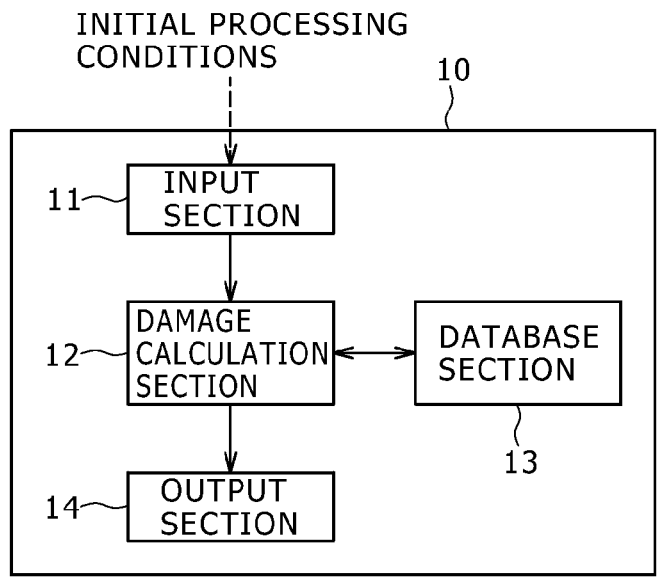
FIG. 1 is a schematic block configuration diagram of a simulator according to a first embodiment of the present disclosure.

A description will be given below of simulators according to the preferred embodiments of the present disclosure, various systems (tools) having the same, and a damage evaluation method in the following order with reference to the accompanying drawings. It should be noted that the present disclosure is not limited to the following embodiments.

1. First embodiment: Basic configuration example of the simulator
2. Second embodiment: Configuration example of the simulator considering the solid angle effect
3. Third embodiment: Configuration example of a simulation system connecting a damage calculation model and shape evolution model
4. Fourth embodiment: Configuration example of a mask pattern layout prediction tool
5. Fifth embodiment: Configuration example of a dry etcher
6. Sixth embodiment: Configuration example of a simulator with a database storing damage data calculated in advance by the Flux method <1. First Embodiment>
[Configuration of the Simulator]

FIG. 1 illustrates the schematic block configuration of a simulator according to a first embodiment. A simulator 10 includes an input section 11, a damage calculation section 12, a database section 13 (database) and an output section 14.

The input section 11 acquires various processing conditions supplied externally. Further, the input section 11 is connected to the damage calculation section 12 and outputs thus obtained processing conditions to the damage calculation section 12. It should be noted that the input section 11 can include desired means so long as this means can serve the above function.

The damage calculation section 12 calculates the damage sustained by a workpiece when the workpiece is subjected to a given process such as etching for a given amount of time.

More specifically, the damage calculation section 12 acquires various processing conditions externally via the input section 11 and searches the database section 13 based on the processing conditions, thus acquiring various parameters necessary for calculations. Then, the damage calculation section 12 calculates the damage sustained by the workpiece after the given period of the given process by the Flux method using the acquired processing conditions and various parameters. It should be noted that the processing conditions and parameters used during damage calculation and the damage calculation method by the Flux method will be described in detail later. Further, the damage calculation section 12 is connected to the output section 14 and outputs a calculated damage prediction (evaluation) result to the output section 14.

It should be noted that, in the present embodiment, the damage calculation section 12 may include hardware to perform various calculations for the damage distribution of a workpiece which will be described later. Alternatively, these various calculations which will be described later may be performed using a given program (software). In this case, the damage calculation section 12 includes a CPU (Central Processing Unit) or other processor that loads a damage distribution calculation program (damage evaluation program) externally and executes the program to calculate the damage distribution of a workpiece.

On the other hand, the damage evaluation program may be stored, for example, in the database section 13 or a separate storage section such as ROM (Read Only Memory). At this time, the damage evaluation program may be, for example, installed in advance in the database section 13 or separate storage section. Alternatively, the program may be, for example, installed into the database section 13 or separate storage section externally. It should be noted that if the damage evaluation program is acquired externally, the program may be distributed in a medium such as optical disk or semiconductor memory. Alternatively, the program may be downloaded via transmission means such as the Internet.

The database section 13 stores various parameters necessary for damage calculations of a workpiece. It should be noted that although a description will be given, in the present embodiment, of an example in which the simulator 10 includes the database section 13, the present disclosure is not limited thereto. Instead, the database section 13 may be provided externally to the simulator 10. Further, if various parameters necessary for damage calculations of a workpiece are supplied externally every simulation run, there is no need to provide the database section 13.

The output section 14 outputs a damage calculation result output from the damage calculation section 12. It should be noted that, at this time, the output section 14 may output information including the processing conditions and parameters used for calculations together with the damage calculation result. The output section 14 includes, for example, one of a display device adapted to display a damage calculation result and a printer adapted to print a calculation result and output the printed result, or a combination of both as appropriate. It should be noted that although a description will be given, in the present embodiment, of an example in which the simulator 10 includes the output section 14, the present disclosure is not limited thereto. Instead, the output section 14 may be provided externally to the simulator 10.

[Simulation Model]

The simulator 10 according to the present embodiment finds, by the Flux method, the distribution of damage sustained by a workpiece during a given process performed on the workpiece. More specifically, the simulator 10 calculates the relationship between the amount of various particles (first substance) externally injected onto a workpiece and the amount of various particles (second substance) released from the workpiece as a result of the injection of the various particles, thus calculating the damage sustained by the workpiece.

(1) Reaction Model of a Workpiece

In finding the relational formula between the amount of various particles injected from the ambient gas (externally) onto a workpiece and the amount of various particles released from the workpiece on the workpiece surface (surface to be processed) by the Flux method, a reaction model between the workpiece and gas is established first. In the present embodiment, a description will be given by taking, as an example, a reaction model for dry-etching a $SiO_2$ film (workpiece) using a CF-based gas and a gas including oxygen (O).

Figure 2:
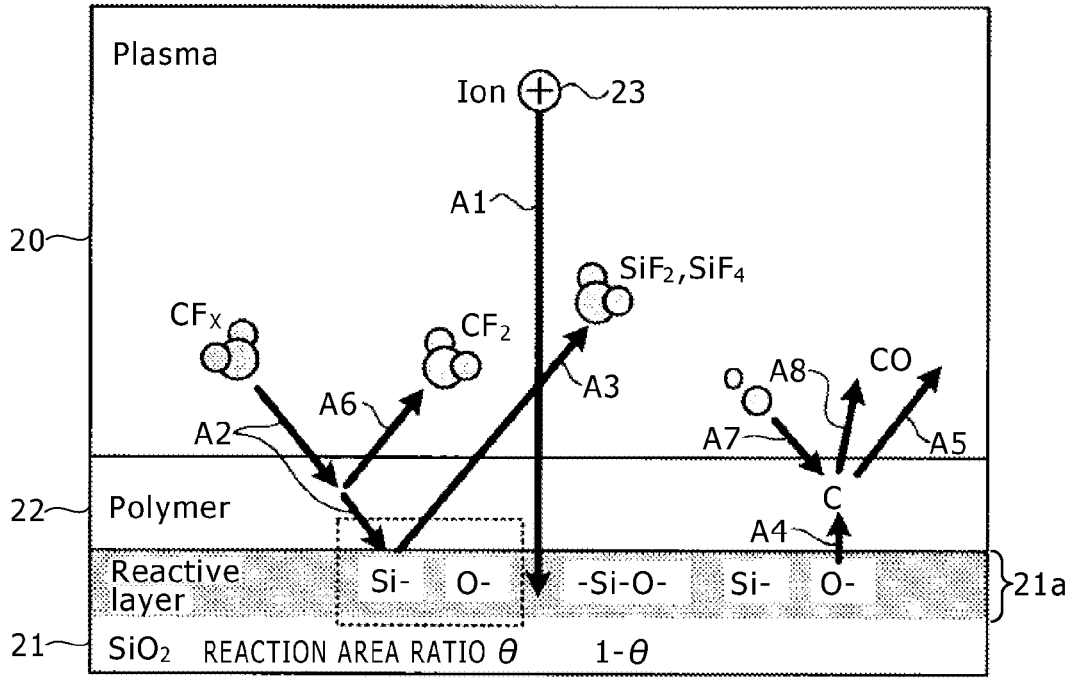
FIG. 2 is an outline diagram of a reaction model of a workpiece used in the first embodiment.

FIG. 2 illustrates the outline of a reaction model near the interface between the $SiO_2$ film and ambient gas (plasma). When a $SiO_2$ film 21 is dry-etched in the atmosphere of a CF-based gas plasma 20, an etching reactive layer 21a (hereinafter simply referred to as the reactive layer 21a) is formed near the surface of the $SiO_2$ film 21. Further, if a CF-based gas is used as an etching gas, a polymer layer 22 including carbon (C) is formed (builds up) on the surface of the $SiO_2$ film 21. That is, a two-layer model made up of the polymer layer 22 and reactive layer 21a is considered in this reaction model.

In the reaction model shown in FIG. 2, the reactions considered for the reactive layer 21a are as follows.

When the $SiO_2$ film 21 is etched as a result of an ion particle 23 being injected (arrow A1 shown in FIG. 2) onto the $SiO_2$ film 21 from the plasma 20 (gas), the bond between silicon (Si) and oxygen (O) is broken in the reactive layer 21a (refer to the area enclosed by a dashed line). At this time, the ratio at which the bond between the silicon (Si) and oxygen (O) is broken (dangling bond ratio) is expressed here by a reaction area ratio $\theta$ ($0<\theta<1$). In the reactive layer 21a, therefore, the ratio at which the silicon (Si) and oxygen (O) remain bonded together is $1-\theta$.

The silicon (Si) whose bond with the oxygen (O) has been broken in the reactive layer 21a reacts with fluorine (F) in the CF-based gas injected via the polymer layer 22 (arrow A2 in FIG. 2), turning into $SiF_2$ and/or $SiF_4$. The produced $SiF_2$ and/or $SiF_4$ are released externally from the $SiO_2$ film 21 (arrow A3 in FIG. 2).

On the other hand, the oxygen (O) whose bond with the silicon (Si) has been broken in the reactive layer 21a reacts with carbon (C) in the polymer layer 22 (arrow A4 in FIG. 2), turning into CO. Then, the produced CO is released externally (arrow A5 in FIG. 2).

On the other hand, in the reaction model shown in FIG. 2, the reactions considered for the polymer layer 22 are as follows.

The carbon (C) in the polymer layer 22 reacts, of all the fluorine (F) in the CF-based gas injected from the plasma 20 (arrow A2 in FIG. 2), that which remains unconsumed (unreacted) in the $SiO_2$ film 21, turning into $CF_2$. Then, the produced $CF_2$ is released externally (arrow A6 in FIG. 2).

Further, the carbon (C) in the polymer layer 22 reacts with the oxygen (O) injected from the plasma 20 (arrow A7 in FIG. 2), turning into CO. Then, the produced CO is released externally (arrow A8 in FIG. 2).

In the present embodiment, the relationship between the amount of various injected particles and the amount of various released particles (products) (hereinafter collectively referred to as the reaction particle flux) in the above various reactions is resolved by using the Flux method, thus predicting and evaluating the damage sustained by the $SiO_2$ film 21.

(2) Reactive Layer Model

In order to evaluate the damage sustained by the $SiO_2$ film 21 along the depth, in the present embodiment, the reactive layer 21a is divided along the depth (along the thickness) into a plurality of thin film slabs (hereinafter simply referred to as the slabs). Then, the relational formula between the various reaction particles in terms of flux acquired from the above reaction model in each slab is found by the Flux method, thus calculating the etching contribution rate and the reaction area ratio θ of each slab.

Figures 3A, 3B:
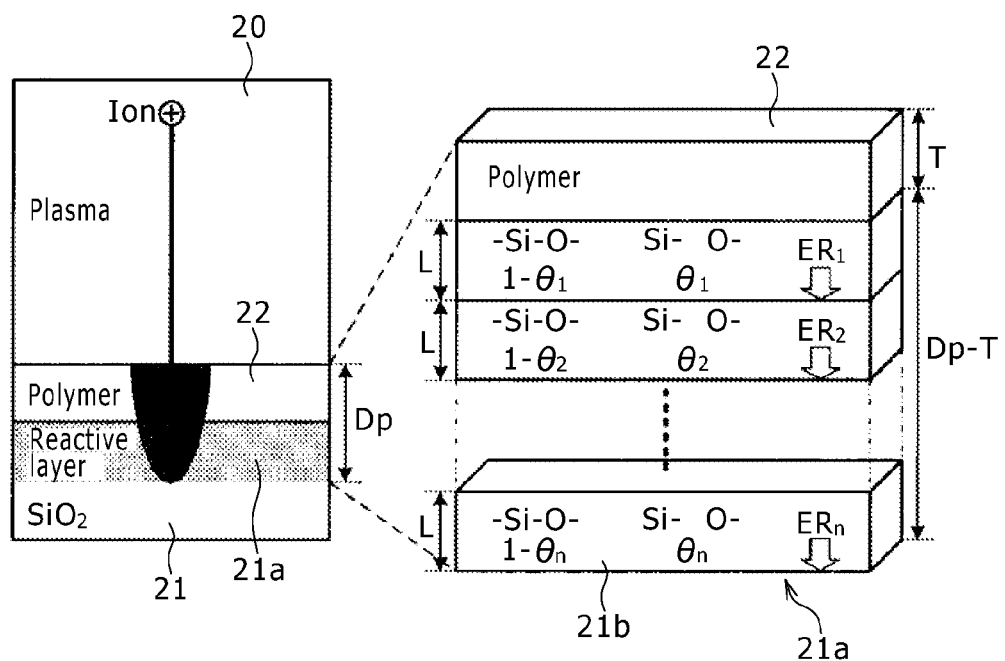
FIGS. 3A and 3B are model configuration diagrams of a reactive layer.

FIGS. 3A and 3B illustrate the model configuration of the reactive layer 21a. It should be noted that FIG. 3A illustrates the overall configuration of the reaction model shown in FIG. 2, and that FIG. 3B illustrates the reactive layer 21a and polymer layer 22 in an enlarged fashion.

FIGS. 3A and 3B illustrate a configuration example in which the reactive layer 21a is divided into 'n' slabs 21b along the thickness. It should be noted that the slabs 21b are equally thick with a thickness L. That is, in this example, the reactive layer 21a is divided equally into the 'n' slabs 21b each having the thickness L. Further, in this example, as for the area subject to calculation (thickness including the reactive layer 21a and polymer layer 22), the maximum penetration depth of the ion particle 23 is Dp, the thickness of the polymer layer 22 (hereinafter referred to as the polymer film thickness) T, and the thickness of the reactive layer 21a Dp–T.

In the present embodiment, an etching contribution rate $ER_k$ (where k is the index of the slabs 21b: k=1, 2, ..., n) and the reaction area ratio $θ_k$ in each of the slabs 21b are found using the relational formula between the various reaction particles in terms of flux at the interface between the adjacent slabs 21b. The specific calculation method of (calculation formula for) the contribution rate $ER_k$ and reaction area ratio $θ_k$ of each of the slabs 21b will be described in detail later. It should be noted that the total sum of the etching contribution rates $ER_k$ of all the slabs 21b is the etching rate of the reactive layer 21a (hereinafter simply referred to as the etch rate ER).

Further, in the present embodiment, the damage sustained by each of the slabs 21b is calculated based on the etching contribution rate $ER_k$ and reaction area ratio $θ_k$ calculated for each of the slabs 21b, thus finding the damage distribution in the reactive layer 21a. At this time, in the present embodiment, in order to find the damage distribution along the depth caused by etching, the thickness L of each of the slabs 21b is converted into a thickness $L_k^*$ which is weighted with the linear ratio of the contribution rate $ER_k$. That is, in the present embodiment, in order to calculate the damage, the reactive layer 21a is redivided into the slabs 21b each having the thickness $L_k^*$ in consideration of the etching contribution rate $ER_k$ of each of the slabs 21b.

Figures 4A, 4B:
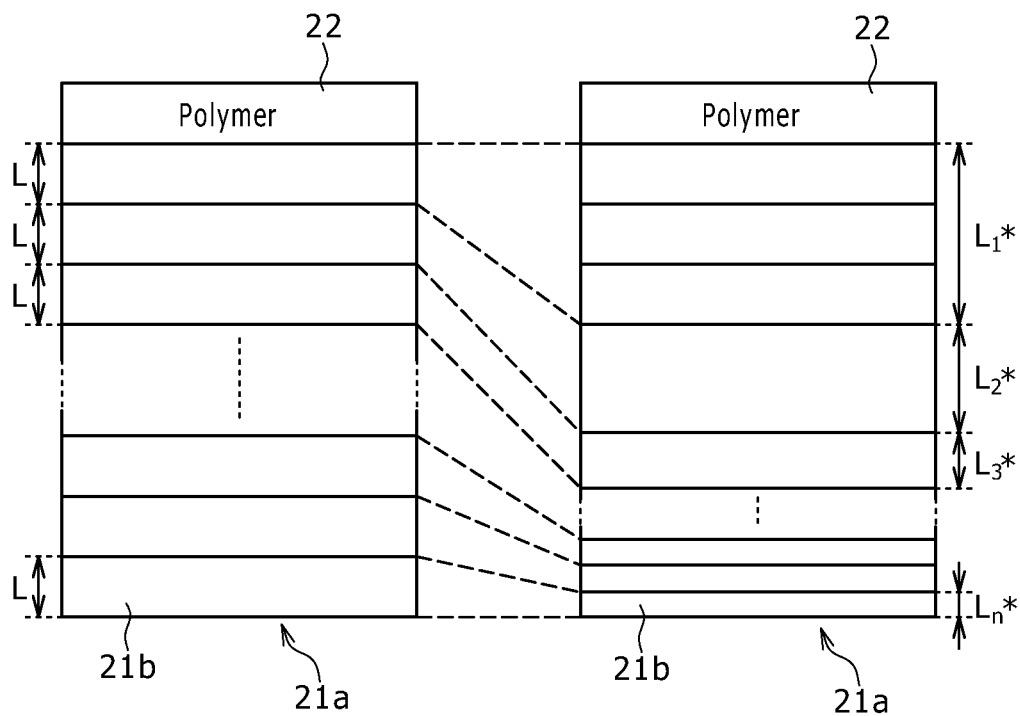
FIGS. 4A and 4B are diagrams for describing a reactive layer redivision method.

FIGS. 4A and 4B illustrate how the reactive layer 21a is redivided. It should be noted that FIG. 4A is a diagram illustrating how the reactive layer 21a is divided before the redivision, and that FIG. 4B is a diagram illustrating how the reactive layer 21a is divided after the redivision.

The thickness $L_k^*$ of each of the slabs 21b varies depending on the etching contribution rate $ER_k$ of the associated slab 21b. Therefore, the thickness $L_k^*$ is no longer constant as illustrated in FIG. 4B and changes along the thickness of the reactive layer 21a. More specifically, the farther the slab 21b is from the surface of the reactive layer 21a along the thickness of the reactive layer 21a, the smaller the etching contribution rate $ER_k$ of the slab 21b. Therefore, the farther the slab 21b is from the surface of the reactive layer 21a, the smaller the thickness $L_k^*$ of the slab 21b after the redivision.

Figures 5A, 5B:
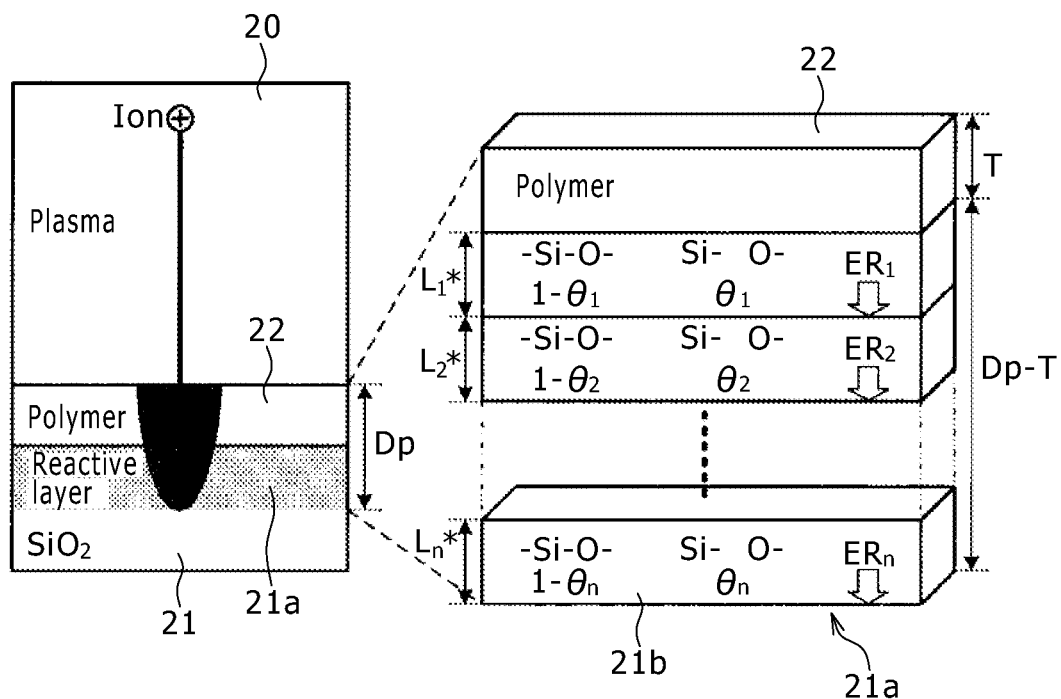
FIGS. 5A and 5B are model configuration diagrams of the reactive layer after redivision.

Further, FIGS. 5A and 5B illustrate the model configuration of the reactive layer 21a after the above redivision. It should be noted that FIG. 5A illustrates the overall configuration of the reaction model shown in FIG. 2, and that FIG. 5B illustrates the reactive layer 21a and polymer layer 22 after the redivision in an enlarged fashion. In the model of the reactive layer 21a shown in FIGS. 5A and 5B, on the other hand, the same elements as those in FIGS. 3A and 3B are denoted by the same reference numerals.

As is obvious from the comparison between FIGS. 5A and 5B and FIGS. 3A and 3B, the model of the reactive layer 21a and polymer layer 22 after the redivision is identical to that before the redivision except that the thicknesses of the slabs 21b in the reactive layer 21a are different. It should be noted that the calculation method of the thickness $L_k^*$ of each of the slabs 21b after the redivision will be described in detail later.

[Calculation Principle of the Damage Distribution]

A description will be given below of the principle behind the technique for calculating, by the Flux method, the damage sustained by the $SiO_2$ film 21 when the same film 21 is dry-etched.

In the simulator 10 according to the present embodiment, the damage calculation section 12 calculates the damage distribution of the $SiO_2$ film 21 based on the processing conditions supplied externally via the input section 11. To briefly describe the calculation process at this time, the damage calculation section 12 calculates a reaction area ratio $θ_k(t)$, etch rate ER(t) and polymer film thickness T(t) of each of the slabs 21b in this order every calculation step Δt (where Δt<etching time t0). Next, the same section 12 repeats this calculation process until a given etching time t0 is reached. Then, the damage calculation section 12 redivides the reactive layer 21a based on the reaction area ratio $θ_k(t)$ of each of the slabs 21b and etch rate ER(t) at the given etching time t0, thus calculating the damage distribution.

A detailed description will be given below of the calculation principle of various evaluation parameters (reaction area ratio $θ_k(t)$, etch rate ER(t), polymer film thickness T(t), thickness $L_k^*$ of each of the slabs 21b after redivision and damage level) found at the time of damage calculation.

(1) Calculation Principle of the Reaction Area Ratio $θ_k(t)$

The reaction area ratio $θ_k(t)$ of each of the slabs 21b at the given time t (≤etching time t0) during etching is found by solving the ordinary differential equation of the reaction area ratio $θ_k(t)$ with respect to time t shown below in Formula (1).

$$\sigma_{SiO2}\frac{d\theta_k(t)}{dt} = Y_{iSiO2}(T')\Gamma_i[1 - \theta_k(t)] - \theta_k(t)\Gamma_O^{ER}(k, t) \quad (1)$$

The first term on the right side of the formula represents the flux of the ion particle 23 that can react with $SiO_2$ in each of the slabs 21b. The second term on the right side represents the CO flux released as a result of the reaction of oxygen (O) in each of the slabs 21b with carbon (C) in the polymer layer 22. Further, "$\sigma_{SiO2}$" in Formula (1) is the surface density of the SiO$_2$ film 21. Further, "Γ$_i$" in Formula (1) is the total flux of the ion particle 23 injected into the SiO$_2$ film from the plasma 20.

"Y$_{iSiO2}$(T')" in Formula (1) is the reaction probability between a CF-based ion and the SiO$_2$ film 21 in the slab 21*b* having the index k. The reaction probability Y$_{iSiO2}$(T') is a function of a depth T' from the surface of the polymer layer 22 to the slab 21*b* having the index k. That is, the reaction probability Y$_{iSiO2}$(T') is a parameter that varies depending on the polymer film thickness T(t) and the position of the slab 21*b*.

It should be noted that the polymer film thickness T(t) is a function of time t. Therefore, the reaction probability Y$_{iSiO2}$(T') is also a function of time t. Hence, the value at time t−Δt which is earlier than the current time t by one calculation step or a given initial value is used as the reaction probability Y$_{iSiO2}$(T') in Formula (1). It should be noted that the reaction probability Y$_{iSiO2}$(T') is calculated by using Formula (2) shown below.

$$Y_{iSiO2}(T')=K\{\alpha 1 \times \exp[\alpha 2 \times (E-\Delta E)]\}$$
$$\Delta E = \alpha 3 + \alpha 4 \times T' \quad (2)$$

In Formula (2), "E" is the incident ion energy, and "ΔE" is the attenuation of the incident ion energy E. Further, "K" and "α1" to "α4" in Formula (2) are given constants. The values of these parameters are set as appropriate, for example, according to the processing conditions including the process conditions, material of the workpiece, and gas type.

On the other hand, "Γ$_O^{ER}$(k,t)" in Formula (1) is expressed as the product of the total flux of oxygen (O) produced in the slab 21*b* having the index k during etching of the SiO$_2$ film 21 and a reaction probability Y$_{OC2}$ between carbon (C) and oxygen (O) in the polymer layer 22. More specifically, "Γ$_O^{ER}$(k,t)" is calculated by using Formula (3) shown below.

$$\Gamma_O^{ER}(k,t) = ER_k(t-1) \times 2\rho_{SiO2} \times Y_{OC2} \quad (3)$$

"ER$_k$(t−1)" in Formula (3) is the etching contribution rate of the slab 21*b* having the index k at time t−Δt which is earlier by one calculation step (or in the initial condition). Further, "ρ$_{SiO2}$" in Formula (3) is the number density of the SiO$_2$ film 21.

Normally, the surface reaction speed during etching (change of the reaction area ratio θ$_k$(t) over time) is considered to be sufficiently faster (smaller) than the one calculation step Δt. In order to calculate the reaction area ratio θ$_k$(t) using Formulas (1) to (3), therefore, the reaction area ratio θ$_k$(t) of each of the slabs 21*b* at the given time t is calculated by assuming dθ$_k$(t)/dt in Formula (1) to be 0. More specifically, the reaction area ratio θ$_k$(t) of each of the slabs 21*b* is calculated by using Formula (4) shown below.

$$\theta_k(t) = \frac{Y_{iSiO2}(T')\Gamma_i}{Y_{SiO2}(T')\Gamma_i + \Gamma_O^{ER}(k,t)} \quad (4)$$

(2) Calculation Principle of the Etch Rate ER(t)

The etch rate ER(t) of the reactive layer 21*a* at the given time t is calculated by using the reaction area ratio θ$_k$(t) of each of the slabs 21*b* calculated in "(1) Calculation principle of the reaction area ratio θ$_k$(t)." More specifically, the etch rate ER(t) is calculated as follows.

First, the etching contribution rate ER$_k$(t) of each of the slabs 21*b* at the given time t is calculated using the reaction area ratio θ$_k$(t) of each of the slabs 21*b* and Formula (5) shown below.

$$ER_k(t) = \frac{\theta_k(t)Y_{FSiO2}(T')\Gamma_F/\beta 1}{\rho_{SiO2}} \quad (5)$$

In Formula (5), "β1" is a parameter relating to a detached substance (SiF$_2$ and/or SiF$_4$ in the example of the reaction model shown in FIG. 2) produced during etching of the SiO$_2$ film 21. Further, "Y$_{FSiO2}$(T')" in Formula (5) is the reaction probability between the SiO$_2$ film 21 and fluorine (F) in the slab 21*b*. It should be noted that the polymer film thickness T(t) is a function of time t. Therefore, the reaction probability Y$_{FSiO2}$(T') is also a function of time t. Hence, the value calculated at time t−Δt which is earlier than the current time t by one calculation step or a given initial value is used as the reaction probability Y$_{FSiO2}$(T') in Formula (5). It should be noted that the reaction probability Y$_{FSiO2}$(T') is calculated by using Formula (6) shown below.

$$Y_{FSiO2}(T') = \alpha 1 \times \exp[\alpha 2 \times (E-\Delta E)] \quad (6)$$

On the other hand, "Γ$_F$" is the product of the total flux of fluorine (F) injected from the plasma 20 onto the SiO$_2$ film 21 and the reaction probability between the CF-based gas and polymer layer 22. More specifically, "Γ$_F$" is expressed by Formula (7) shown below.

$$\Gamma_F = \sum_m \Gamma_{CFm} Y_{CFm} R_{Fm} \quad (7)$$

It should be noted that "Γ$_{CFm}$" in Formula (7) is the total flux of the CF-based gas injected from the plasma 20. "Y$_{CFm}$" in Formula (7) is the reaction probability between the CF-based gas and polymer layer 22. "R$_{Fm}$" in Formula (7) is the ratio of fluorine (F) in the CF-based gas. Further, an index m in Formula (7) represents the type of the reaction gas CF.

Then, the etching contribution rates ER$_k$(t), calculated by using Formula (5), are summed up to calculate the etch rate ER(t) of the reactive layer 21*a* at the given time t. More specifically, the etch rate ER(t) at the given time t is calculated by using Formula (8) shown below.

$$ER(t) = \sum_k ER_k(t) \quad (8)$$

(3) Calculation Principle of the Polymer Film Thickness T(t)

The polymer film thickness T(t) at the given time t is calculated by using the reaction area ratio θ$_k$(t) and etch rate ER(t) calculated respectively based on the calculation principles described in Sections (1) and (2).

More specifically, the polymer film thickness T(t) is found by solving the ordinary differential equation of the polymer film thickness T(t) with respect to time t shown below in Formula (9). At this time, the polymer film thickness T(t) is calculated, for example, by substituting dT(t)/dt in Formula (9) by a difference formula such as [T(t)−T(t−Δt)]/Δt.

$$\rho_P \frac{dT(t)}{dt} = \Gamma_C - \Gamma_O - \Gamma_F^* - \sum_k \theta_k(t)\Gamma_O^{ER}(k,t) \quad (9)$$

The first term on the right side of Formula (9) represents the flux of carbon (C) injected onto the SiO$_2$ film 21 from the plasma 20. The second term on the right side of Formula (9)

represents the CO flux released as a result of the reaction of oxygen (O) in the plasma 20 with carbon (C) in the polymer layer 22. The third term on the right side of Formula (9) represents the flux of $CF_2$ released as a result of the reaction between fluorine (F) which remains unconsumed (unreacted) in the $SiO_2$ film 21 of all the fluorine (F) injected onto the $SiO_2$ film 21 from the plasma 20 and carbon (C) in the polymer layer 22. Further, the fourth term on the right side of Formula (9) represents the total flux of CO released as a result of the reaction between oxygen (O) in each of the slabs 21b and carbon (C) in the polymer layer 22.

"$\rho_P$" in Formula (9) is the number density of the polymer layer 22. Further, "$\Gamma_C$" in Formula (9) is the product of the total flux of carbon (C) injected from the plasma 20 and the reaction probability between the CF-based gas and polymer layer 22. More specifically, "$\Gamma_C$" is expressed by Formula (10) shown below. It should be noted that "$R_{Cm}$" in Formula (10) is the ratio of carbon (C) in the CF-based gas.

$$\Gamma_C = \sum_m \Gamma_{CFm} Y_{CFm} R_{Cm} \qquad (10)$$

On the other hand, "$\Gamma_O$" in Formula (9) is the product of the total flux of oxygen (O) injected from the plasma 20 and the reaction probability between oxygen (O) and the polymer layer 22. More specifically, "$\Gamma_O$" is expressed by Formula (11) shown below.

$$\Gamma_O = Y_{OC1} \Gamma_O^P \qquad (11)$$

It should be noted that "$Y_{OC1}$" in Formula (11) is the reaction probability between oxygen (O) and carbon (C) in the polymer layer 22. Further, "$\Gamma_O^P$" in Formula (11) is the total flux of oxygen (O) injected from the plasma 20.

Further, "$\Gamma_F^*$" in Formula (9) is the product of the flux of fluorine (F) which remains unconsumed (unreacted) in the $SiO_2$ film 21 of all the fluorine (F) injected onto the $SiO_2$ film 21 from the plasma 20 and the reaction probability between fluorine (F) and the polymer layer 22. More specifically, "$\Gamma_F^*$" is expressed by Formula (12) shown below.

$$\Gamma_F^* = (1 - Y_{FSiO2}(T)\beta 1)\Gamma_F R_d/\beta 2 \qquad (12)$$

It should be noted that "$\beta 2$" in Formula (12) is a parameter relating to a detached substance ($CF_2$ in the example of the reaction model shown in FIG. 2) produced during etching of the polymer layer 22. On the other hand, "$R_d$" in Formula (12) is the reaction probability between fluorine (F) and carbon (C) in the polymer layer 22.

(4) Recalculation Principle of the Slab Thickness

In the present embodiment, in order to calculate the damage distribution, the thickness of each of the slabs 21b is reset (recalculated) in consideration of the ratio (weight) of the contribution rate $ER_k$ of each of the slabs 21b in the etch rate ER as described above. Then, the reactive layer 21a is redivided into the plurality of slabs 21b each having the reset thickness.

In this example, a linear ratio is used as the weight of the contribution rate $ER_k$ of each of the slabs 21b in the etch rate ER so as to reset the thickness of each of the slabs 21b to $L_k^*$ using Formula (13) shown below. It should be noted that the etch rate ER, contribution rate $ER_k$ and polymer film thickness T in Formula (13) are those at the time of the end of etching (t=t0).

$$L_k^* = \frac{ER_k}{ER} \times (Dp - T) \qquad (13)$$

If the thickness of each of the slabs 21b is reset by using Formula (13), the overall thickness (Dp−T) of the reactive layer 21a after the redivision remains unchanged. However, the farther each of the slabs 21b is from the surface of the reactive layer 21a, the smaller the thickness $L_k^*$ of each of the slabs 21b (refer to FIG. 4B). As a result, the thicknesses $L_k^*$ of the slabs 21b near the surface of the reactive layer 21a whose contribution rates $ER_k$ are greater are greater than before the redivision. On the other hand, the thicknesses $L_k^*$ of the slabs 21b near the bottom of the reactive layer 21a whose contribution rates $ER_k$ are smaller are smaller than before the redivision.

By resetting the thickness of each of the slabs 21b as described above, it is possible to reflect the impact of the contribution rates $ER_k$ of each of the slabs 21b in the etch rate ER in the reset thicknesses $L_k^*$ of the slabs 21b. That is, by resetting the thickness of each of the slabs 21b to the value weighted with the corresponding contribution rate $ER_k$, it is possible to reflect information about damage along the depth in the thickness $L_k^*$ of each of the slabs 21b.

(5) Calculation Principle of the Damage Level

In the present embodiment, the number of dangling bonds of silicon (Si) taking place during etching is used as an indicator of damage caused by etching. In the present embodiment, therefore, a damage level damage(k) of each of the slabs 21b caused by etching is defined as the product of the thickness $L_k^*$ of each of the slabs 21b after redivision and the reaction area ratio $\theta_k$ at the end of etching. That is, the damage level damage(k) of each of the slabs 21b is defined by using Formula (14) shown below.

$$\text{damage}(k) = L_k^* \times \theta_k \qquad (14)$$

By defining the damage level damage(k) of each of the slabs 21b by using Formula (14) shown above, it is possible to express the damage level along the depth factoring in the etch rate ER.

On the other hand, "$L_k^*$" in Formula (14) is a parameter weighted with the etching contribution rate $ER_k$ of each of the slabs 21b (factoring in the etching rate). Therefore, "$L_k^*$" is a parameter relating to the damage distribution along the depth of the reactive layer 21a. On the other hand, "$\theta_k(t)$" is a parameter relating to the damage distribution in the in-plane direction of the etched surface. Hence, it is possible to evaluate the three-dimensional damage distribution by defining the damage damage(k) of each of the slabs 21b by using Formula (14) shown above.

[Calculation of the Damage Distribution]

Figure 6:
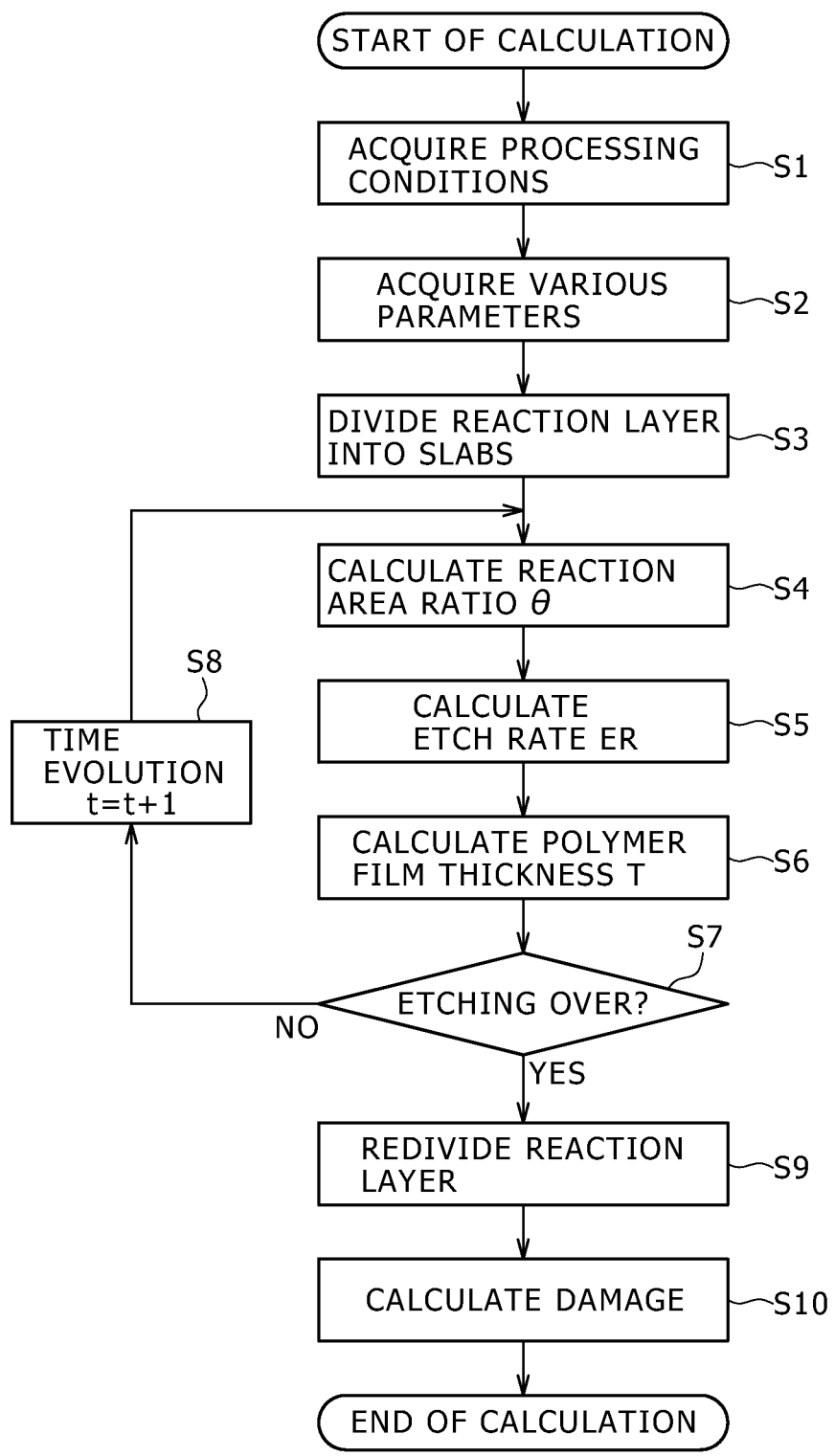
FIG. 6 is a flowchart illustrating the procedure for calculating the damage distribution of a workpiece in the first embodiment.

A specific description will be given next of the calculation of damage sustained by the workpiece ($SiO_2$ film) performed by the simulator 10 according to the present embodiment with reference to FIG. 6. It should be noted that FIG. 6 is a flowchart illustrating the procedure for calculating the damage distribution in the present embodiment.

First, the damage calculation section 12 acquires various processing conditions supplied to the simulator 10 externally via the input section 11 (step S1).

Among the processing conditions acquired in step S1 are gas type, gas flow rate, gas pressure, workpiece temperature (e.g., wafer temperature), material of the workpiece (e.g., film type), etching time and ion injection energy. Further, among the processing conditions are calculation parameters such as the initial thickness L of each of the slabs 21b (thickness before redivision), initial polymer film thickness T and maximum penetration depth Dp of the ion particle 23 (depth of the area subject to calculation).

Next, the damage calculation section 12 searches the database section 13 based on the acquired processing conditions (particularly, gas type, gas flow rate, gas pressure, material of the workpiece and so on), thus acquiring various parameters necessary for the simulation (step S2).

Among the various parameters acquired in step S2 are those relating to various reactions between the workpiece and gas such as the fluxes $\Gamma$ of various reaction particles corresponding to the processing conditions (e.g., $\Gamma_i$, $\Gamma_{CF}$, $\Gamma_O^P$), various reaction probabilities and reaction product parameters. Further, among the various parameters acquired in step S2 are parameters of the material of the workpiece such as the number density and surface density of the $SiO_2$ film 21.

It should be noted, however, that if the fluxes $\Gamma$ of various reaction particles corresponding to the processing conditions are not available in the database section 13 in step S2, the fluxes $\Gamma$ of various reaction particles corresponding to the processing conditions may be calculated, for example, as described below. First, the damage calculation section 12 acquires data of the fluxes $\Gamma$ of various reaction particles corresponding to conditions close to the processing conditions. Next, the same section 12 interpolates the acquired data, thus calculating the fluxes $\Gamma$ of various reaction particles corresponding to the processing conditions.

It should be noted that the acquisition method of the fluxes $\Gamma$ of various reaction particles corresponding to the processing conditions in step S2 is not limited to that adapted to acquire the fluxes $\Gamma$ from the database section 13. Alternatively, for example, the damage calculation section 12 may calculate the fluxes $\Gamma$ of various reaction particles based on the acquired processing conditions (particularly, gas type, gas flow rate, gas pressure, material of the workpiece and so on).

On the other hand, for example, if the measured values of the fluxes $\Gamma$ of various reaction particles can be acquired externally, the damage calculation section 12 may acquire the fluxes $\Gamma$ of various reaction particles in step S2 externally via the input section 11. It should be noted that not only the fluxes $\Gamma$ of various reaction particles but also various parameters to be acquired in step S2 may be directly entered externally. In this case, the process step in step S2 may be omitted, and these various parameters necessary for the damage calculations may be acquired in step S1.

Next, the damage calculation section 12 divides the reactive layer 21a into the plurality of slabs 21b based on the initial thickness L of the slabs 21b, initial thickness T of the polymer layer 22 and the maximum penetration depth Dp of the ion particle 23 acquired in step S1 (step S3). More specifically, the reactive layer 21a having the initial depth Dp–T (initial value) is equally divided into the plurality of slabs 21b each having the initial thickness L.

Next, the damage calculation section 12 calculates the reaction area ratio $\theta_k(t)$ of each of the slabs 21b at the given time t ($\leq$etching time t0) using the acquired processing conditions and various parameters corresponding to these conditions (step S4). More specifically, the damage calculation section 12 calculates the reaction area ratio $\theta_k(t)$ of each of the slabs 21b using Formulas (1) to (4) shown above.

Next, the damage calculation section 12 calculates the etch rate ER(t) at the given time t using the reaction area ratio $\theta_k(t)$ of each of the slabs 21b calculated in step S4 (step S5). More specifically, the damage calculation section 12 calculates the etch rate ER(t) using Formulas (5) to (8) shown above.

Next, the damage calculation section 12 calculates the polymer film thickness T(t) at the given time t using the reaction area ratio $\theta_k(t)$ of each of the slabs 21b and the etch rate ER(t) calculated in steps S4 and S5, respectively (step S6). More specifically, the damage calculation section 12 calculates the polymer film thickness T(t) using Formulas (9) to (12) shown above.

Next, the damage calculation section 12 determines whether the current time t has reached the etching end time (step S7). More specifically, the damage calculation section 12 determines whether the elapsed time from the beginning of the calculation has reached the etching time t0 set in advance.

If the current time t has yet to reach the etching end time in step S7, the determination in step S7 is No. In this case, the damage calculation section 12 performs time evolution, that is, updates the calculation time (t=t+$\Delta$t) (step S8) and then returns to the process step in step S4. Then, the damage calculation section 12 repeats steps S4 to S8 until the time t reaches the etching time t0.

On the other hand, when the current time t has reached the etching end time in step S7, the determination in step S7 is Yes. In this case, the damage calculation section 12 redivides the reactive layer 21a into the plurality of slabs 21b in consideration of the ratio (weight) of the contribution rate $ER_k$ of each of the slabs 21b in the etch rate ER at the etching end time (t=t0) (step S9). More specifically, the damage calculation section 12 resets the thickness $L_k^*$ of each of the slabs 21b using Formula (13) shown above, thus redividing the reactive layer 21a into the plurality of slabs 21b each having the reset thickness.

Then, after having redivided the reactive layer 21a into the plurality of slabs 21b, the damage calculation section 12 calculates the damage level damage(k) of each of the slabs 21b caused by etching (step S10). More specifically, the damage calculation section 12 calculates the damage level damage(k) of each of the slabs 21b by using Formula (14) shown above.

In the present embodiment, the damage level damage(k) of each of the slabs 21b during etching is calculated as described above, thus predicting (evaluating) the damage distribution of the workpiece.

The present embodiment is an approach using the Flux method as described above, thus contributing to a significantly reduced amount of calculations as compared to the past approaches (particle method) based on molecular dynamics. Therefore, the simulator 10 according to the present embodiment allows for calculation of the damage distribution of a workpiece more quickly.

More specifically, if a database is created using the damage distribution calculated using various processing conditions as in a sixth embodiment which will be described later, the Flux method can, for example, reduce the time it takes to create a database from about a month with the particle method to several minutes or so. That is, the present embodiment can calculate the damage distribution in an exceptionally shorter amount of time than the past particle method. This makes it possible for the present embodiment to predict the damage distribution over a wide area such as across the chip or wafer surface.

It should be noted that a case has been described in the present embodiment in which the $SiO_2$ film 21 is dry-etched using a CF-based gas as a reaction model, the present disclosure is not limited thereto. Even if the workpiece is, for example, an Si, SiN or organic film, it is possible to predict (evaluate) the damage distribution with the same algorithm. Further, even if the gas type is changed, it is possible to predict (evaluate) the damage distribution with the same algorithm.

It should be noted, however, that if the material of the workpiece and/or the gas type is changed, the reaction model also changes. Therefore, the relational formula between the fluxes Γ of various reaction particles is set as appropriate according to the reaction model to be considered. Further, in this case, various parameters necessary for the damage calculations are changed as appropriate according to the reaction model to be considered. It should be noted that if the gas type is changed, the film that builds up on the reactive layer $21a$ is also changed as appropriate according to the gas type (e.g., changed to an oxide film).

[Various Evaluation Examples]

A description will be given next of various evaluation examples using the simulator 10 according to the present embodiment described above.

(1) Evaluation Example 1

In evaluation example 1, the reproducibility of the etch rate ER and polymer film thickness T was evaluated by using the simulator 10 according to the present embodiment. More specifically, the measured values of the etch rate ER and polymer film thickness T at the time of dry-etching of the $SiO_2$ film 21 using the plasma 20 of a CF-based gas were compared against the predicted values calculated by the above simulation.

The process conditions in evaluation example 1 are as follows. The $C_4F_8$ gas was used as a CF-based gas. A mixture gas of argon (Ar) and oxygen ($O_2$) was circulated in the chamber of the etcher. The flow rates of argon (Ar) and oxygen ($O_2$) were maintained constant respectively at 400 sccm and 8 sccm. Further, the flow rate of the $C_4F_8$ gas was varied to compare the measured values of the etch rate ER and polymer film thickness T against the predicted values at each flow rate. Still further, the gas pressure in the chamber was set at 30 mT, and the incident ion energy E of the ion particle 23 was 1450 V.

As for the fluxes Γ of various reaction particles used for simulation calculations, the measured values monitored in the chamber of the etcher were used. On the other hand, the initial values of various parameters used for simulation calculations were set as appropriate according to the process conditions and other factors. Further, the initial values of the various evaluation parameters (polymer film thickness T, etch rate ER and contribution rate $ER_k$ of each of the slabs $21b$) were all set to zero.

Figure 7:
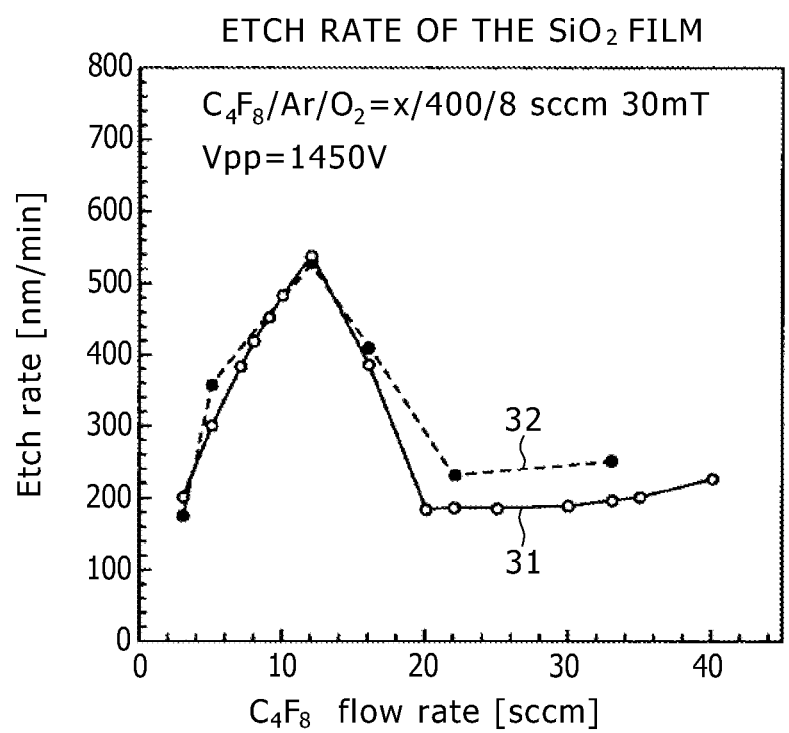
FIG. 7 is a diagram illustrating the results of evaluation example 1.
Figure 8:
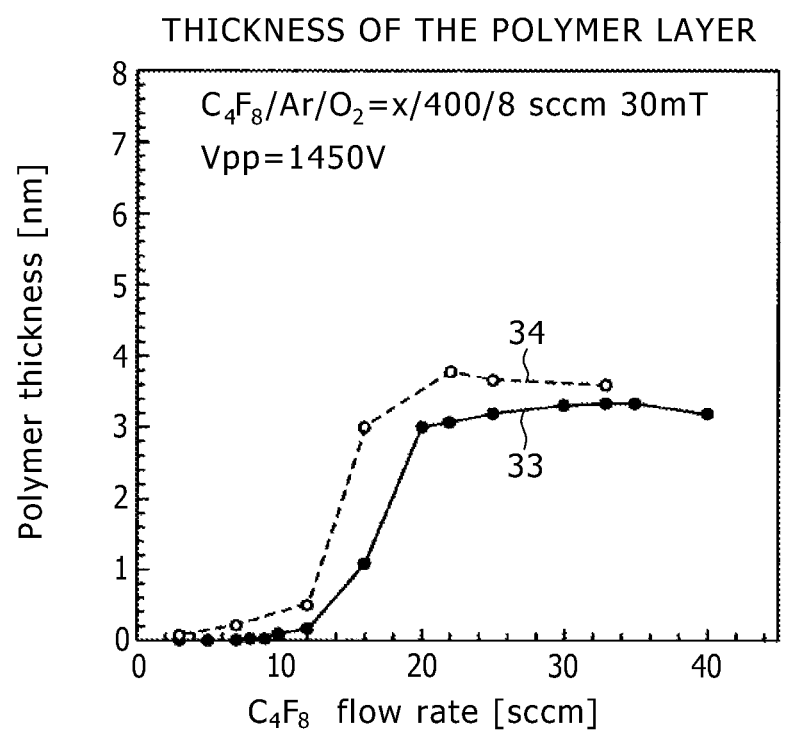
FIG. 8 is a diagram illustrating the results of evaluation example 1.

FIGS. 7 and 8 illustrate the results of evaluation example 1. FIG. 7 illustrates the characteristic of change in the etch rate ER with change in the flow rate of $C_4F_8$, with the horizontal axis representing the flow rate of $C_4F_8$ and the vertical axis representing the etch rate ER. On the other hand, FIG. 8 illustrates the characteristic of change in the polymer film thickness T with change in the flow rate of $C_4F_8$, with the horizontal axis representing the flow rate of $C_4F_8$ and the vertical axis representing the polymer film thickness T. It should be noted that characteristics 31 and 33 shown by solid lines in FIGS. 7 and 8 are characteristics of the predicted values obtained by the simulation, and that characteristics 32 and 34 shown by dashed lines in FIGS. 7 and 8 are characteristics of the measured values.

As is obvious from the evaluation results shown in FIGS. 7 and 8, the distinctive changes of the characteristics 32 and 34 of the measured values and the absolute values of the etch rate ER and polymer film thickness T are reproduced with high accuracy by the characteristics 31 and 33 obtained from the simulation. That is, it is clear from these results that the simulation technique according to the present embodiment can predict, with high accuracy, the etch rate ER and polymer film thickness T of a workpiece.

(2) Evaluation Example 2

In evaluation example 2, the Si film is dry-etched under the same process conditions as in evaluation example 1 to find the measured values and the predicted values calculated by the above simulation in the same manner as in evaluation example 1, of the etch rate ER of the Si film at various flow rates of $C_4F_8$. Then, in evaluation example 2, the measured and predicted values of the etch rate selection ratio between the $SiO_2$ and Si films (=$SiO_2$ film etch rate/Si film etch rate) were calculated together with the evaluation result of evaluation example 1 for comparison between the two. It should be noted that the etch rate selection ratio between the $SiO_2$ and Si films is an important parameter for etching the $SiO_2$ film into a desired pattern in a multilayer film made up of a $SiO_2$ film formed on a Si film.

Figure 9:
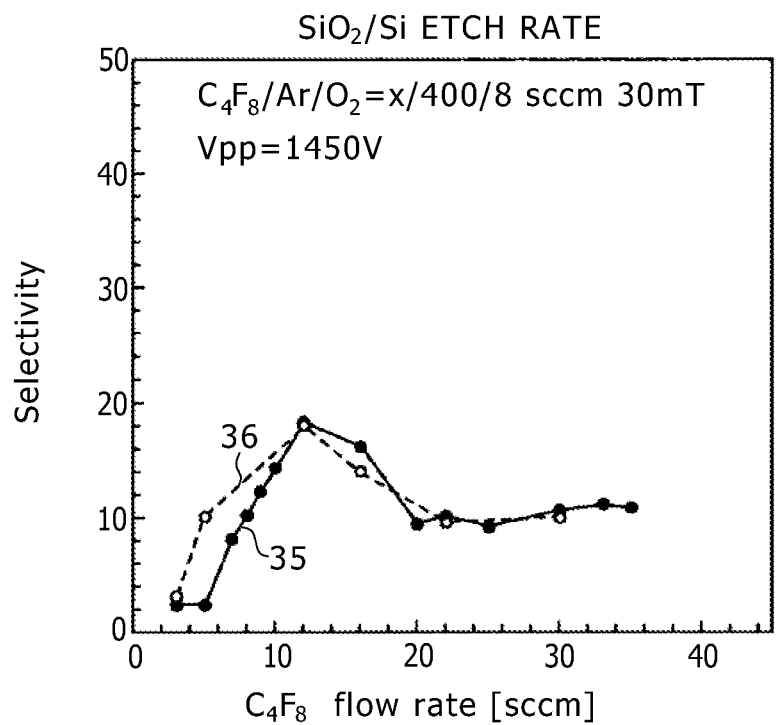
FIG. 9 is a diagram illustrating the results of evaluation example 2.

FIG. 9 illustrates the result of evaluation example 2. It should be note that FIG. 9 illustrates the characteristic of change in the etch rate selection ratio with change in the flow rate of $C_4F_8$, with the horizontal axis representing the flow rate of $C_4F_8$ and the vertical axis representing the etch rate selection ratio. Further, a characteristic 35 shown by a solid line in FIG. 9 is a characteristic of the predicted value obtained by the simulation, and that a characteristic 36 shown by a dashed line in FIG. 9 is a characteristic of the measured value.

As is obvious from the evaluation result shown in FIG. 9, the distinctive change of the characteristic 36 of the measured value and the absolute value of the etch rate selection ratio between the $SiO_2$ and Si films are reproduced with high accuracy by the characteristic 35 obtained from the simulation.

(3) Evaluation Example 3

In evaluation example 3, the reproducibility of the damage distribution of a workpiece by the simulator 10 according to the present embodiment was evaluated.

It should be noted that, in the present embodiment, a TEM (Transmission Electron Microscope) image of the workpiece was used to find the measured value of the damage distribution of the workpiece. However, if a $SiO_2$ film is used as a workpiece, the workpiece is oxidized. Therefore, it is difficult to clearly identify the thickness of the damaged layer (hereinafter referred to as the etching-damaged layer) in a TEM image.

For this reason, in evaluation example 3, the measured value of the damage distribution and the predicted value thereof obtained by the simulation were compared for evaluation in the Si film in which the thickness of the etching-damaged layer was clearly identifiable.

It should be noted that a Si film was used as a workpiece in evaluation example 3. Therefore, the reaction model was changed to one corresponding to dry etching of a Si film. Various parameters used for damage calculations (e.g., surface density and number density of the workpiece, reaction probability) were also changed as appropriate. Therefore, the relational formula between the fluxes Γ of various reaction particles was also changed as appropriate because of the change in reaction model. For dry etching of a Si film, for example, the term of "$\theta \Gamma_O^{ER}$" is omitted in Formulas (1) and (9).

In evaluation example 3, a Si film was dry-etched with a CF-based gas using a CCP (Capacitively Coupled Plasma) etcher, thus measuring the damage distribution of the Si film. It should be noted that, in evaluation example 3, the flow rate of $C_4F_8$ was maintained constant at 11 sccm and all other process conditions were the same as in evaluation example 2. Further, in evaluation example 3, the thickness of the etching-damage layer was measured not only with a TES image but also by using XPS (X-ray Photoelectron Spectroscopy).

Further, in the simulation calculations for evaluation example 3, the initial thickness L of each of the slabs 21*b* was 0.5 nm, and the maximum penetration depth Dp of the ion particle 23 was 7 nm. It should be noted that, in evaluation example 3, an etcher was used that was equipped with various devices adapted to monitor the fluxes Γ of various reaction particles and the incident ion energy E in its chamber. Therefore, the monitored (measured) values were used for the parameters for simulation calculations.

Figure 10A:
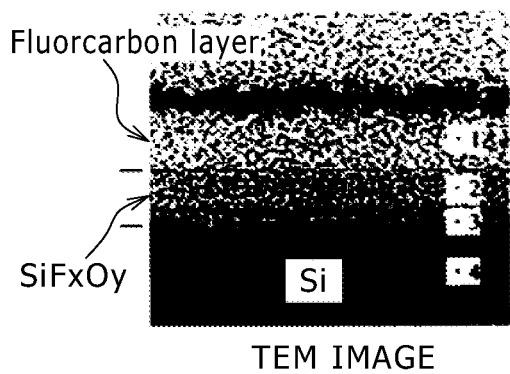
FIGS. 10A and 10B are diagrams illustrating the results of evaluation example 3.
Figure 10B:
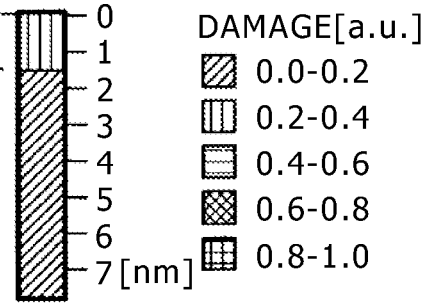

FIGS. 10A and 10B illustrate the results of evaluation example 3. It should be noted that FIG. 10A illustrates a TEM image showing the cross-sectional structure of the Si film near its surface. FIG. 10B is a characteristic diagram of the damage distribution calculated by the simulator 10 along the depth of the reactive layer 21*a*.

In the TEM image, the thickness of the etching-damaged layer was approximately 1.4 nm. Further, a similar result was obtained from XPS.

In the simulation result, on the other hand, the damage level was 0.2 to 0.4 in the area 1.5 nm in depth from the surface of the Si film. The damage level was 0.0 to 0.2 in the area deeper than 1.5 nm. That is, in the simulation result (predicted value), the thickness of the etching-damaged layer was approximately 1.5 nm which is roughly the same as the measured value.

It is clear from the evaluation result of evaluation example 3 described above that the damage distribution along the depth of the workpiece can be reproduced by the simulator 10 according to the present embodiment with high accuracy.

(4) Evaluation Example 4

In evaluation example 4, the change in damage distribution of a $SiO_2$ film with change in flow rate of a CF-based gas was calculated by the simulator 10 according to the present embodiment for evaluation.

More specifically, using $C_4F_8$ as a CF-based gas, the damage distribution along the depth of a $SiO_2$ film was calculated (predicted) with the simulator 10 with the flow rate of $C_4F_8$ at 11 sccm or 33 sccm. That is, the damage distribution along the depth of the $SiO_2$ film was calculated in the condition (11 sccm) in which the etch rate ER was large and the polymer film thickness T was small or the condition (33 sccm) in which the etch rate ER was small and the polymer film thickness T was large.

It should be noted that, in the simulation calculations for evaluation example 4, the calculation conditions (initial values of various calculation parameters and process conditions) were the same as in evaluation example 3 except that a $SiO_2$ film was use as a workpiece, and that the flow rate of $C_4F_8$ was changed.

Figure 11:
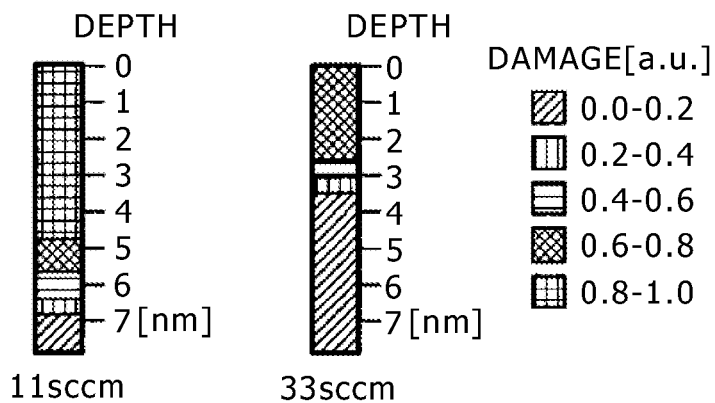
FIG. 11 is a diagram illustrating the results of evaluation example 4.

FIGS. 11A and 11B illustrate the simulation result of evaluation example 4. As is obvious from FIG. 11, the damage level was maximal in the area near the surface of the $SiO_2$ film and decreased with increasing depth away from the surface, irrespective of the gas flow rate.

Further, as is obvious from the result shown in FIGS. 11A and 11B, when the gas flow rate was 11 sccm, the damage level was 0.2 to 0.4 or more in the area down to about 7 nm in depth from the surface of the $SiO_2$ film. On the other hand, when the gas flow rate was 33 sccm, the damage level was 0.2 to 0.4 or more in the area down to about 3.5 nm in depth from the surface of the $SiO_2$ film. Further, as a result of comparison of the damage levels near the surface, the damage level was found to be greater when the flow rate was 11 sccm than when the flow rate was 33 sccm.

It is clear from the evaluation result of evaluation example 4 described above that the damage level of the workpiece was greater and the workpiece was damaged deeper in the condition (11 sccm) in which the etch rate ER was large and the polymer film thickness T was small. That is, it has been discovered from this evaluation result that the simulator 10 according to the present embodiment can quantitatively evaluate the characteristic of probable change in damage distribution resulting from the change in flow rate of $C_4F_8$ during etching of a $SiO_2$ film with a CF-based gas.

It is clear from the results of evaluation examples 1 to 4 described above that the simulator 10 according to the present embodiment can predict and evaluate, with high accuracy, the damage distribution of a workpiece that takes place as a result of ion injection.

<2. Second Embodiment>

A description has been given in the first embodiment of a case in which no structure (e.g., side walls) is formed around the damage evaluation point that is designed to prevent the injection of various reaction particles from the plasma (gas) onto the workpiece. In a practical device pattern, however, the surface to be processed, i.e., an area to be evaluated, often has a shape with projections and depressions (three-dimensional shape). In this case, of various reaction particles injected onto the workpiece from the plasma, the fluxes of those particles reaching the bottom surface of the depressed portion of the surface to be processed vary depending on the shape of the depressed portion (e.g., width, depth and aspect ratio therebetween).

In the second embodiment, for this reason, a description will be given below of a configuration example of a simulator capable of calculating the damage distribution even if there is a structure around the damage evaluation point that prevents the injection of various reaction particles onto the workpiece from the plasma.

If the fluxes of various reaction particles injected onto the evaluation point on the bottom of the depressed portion vary (decrease) because of the impact of the structure such as side walls formed around the evaluation point, this variation depends on the field-of-view region there is a line of sight from the evaluation point to the plasma. In the present embodiment, the field-of-view region in which there is a line of sight from the evaluation point to the plasma is expressed by a three-dimensional angle (hereinafter referred to as a solid angle), and the impact of the surrounding structure on the damage distribution at the evaluation point is reflected in the solid angle.

[Calculation Principle of the Solid Angle Effect]

A specific description will be given first of the method of reflecting the impact of the surrounding structure on the damage distribution at the evaluation point in the solid angle at the evaluation point (hereinafter referred to as the solid angle effect calculation method) with reference to the accompanying drawings. It should be noted that a workpiece with a groove portion formed on its surface (workpiece having a trench structure) will be taken as an example to describe the solid angle effect calculation method at the evaluation point.

Figure 12A:
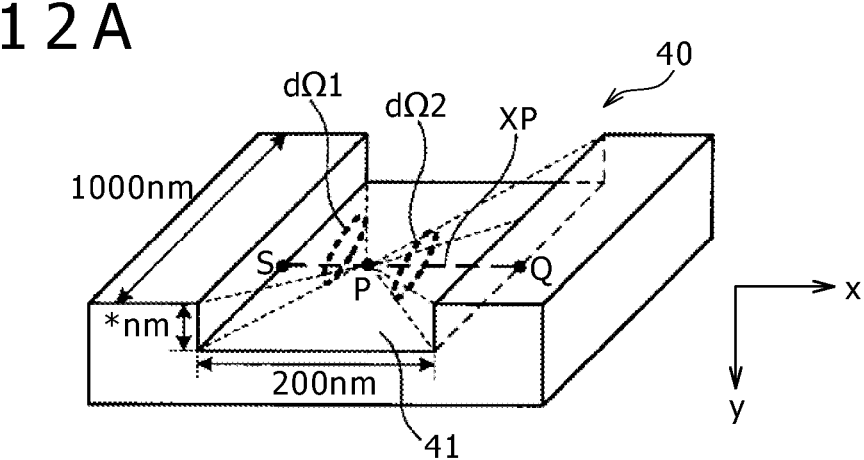
FIGS. 12A and 12B are diagrams for describing the solid angle effect considered in the simulator according to a second embodiment of the present disclosure.
Figure 12B:
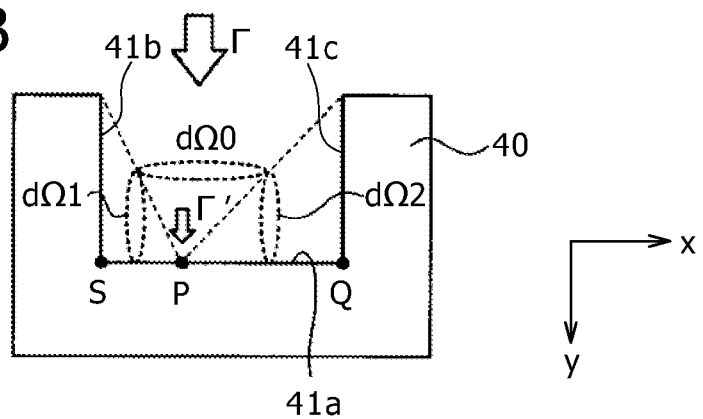

FIGS. 12A and 12B schematically illustrate the configuration of a workpiece with a groove portion formed on its surface. It should be noted that FIG. 12A is a schematic perspective view of a workpiece 40 and FIG. 12B is a side view of the workpiece 40 as seen from the direction of extension of a groove portion 41.

A given evaluation point on a bottom surface 41*a* (surface to be processed) of the groove portion 41 of the workpiece 40 in FIGS. 12A and 12B is denoted by 'P.' Further, the intersection between a line segment on the bottom surface 41*a* passing through the evaluation point P and extending in the direction orthogonal to the direction of extension of the groove portion 41 and a side wall surface 41*b* is denoted by 'S.' The intersection between this line segment and another side wall surface 41c is denoted by 'Q.' The line segment connecting the points S and Q is denoted by 'XP.'

In the present embodiment, the solid angle at the given evaluation point P on the bottom surface 41a of the groove portion 41 is calculated as follows. It should be noted that, in the present embodiment, the solid angle at the given evaluation point P is obtained by subtracting the field-of-view region (solid angle) obstructed by the surrounding structure from the overall solid angle ($2\pi$) at the evaluation point P. That is, a solid angle $d\Omega 0$ at the evaluation point P is obtained by subtracting, from the overall solid angle ($2\pi$), a solid angle $d\Omega 1$ of the field-of-view region obstructed by the side wall surface 41b and a solid angle $d\Omega 2$ of the field-of-view region obstructed by the other side wall surface 41c.

It should be noted, however, that the field-of-view regions obstructed by the side wall surfaces 41b and 41c at the evaluation point P are rectangular. In the present embodiment, the rectangular field-of-view regions are converted, in a simplified manner, into circles having the same areas, thus calculating the solid angles ($d\Omega 1'$ and $d\Omega 2'$) obstructed by the side wall surfaces 41b and 41c.

Figure 13A:
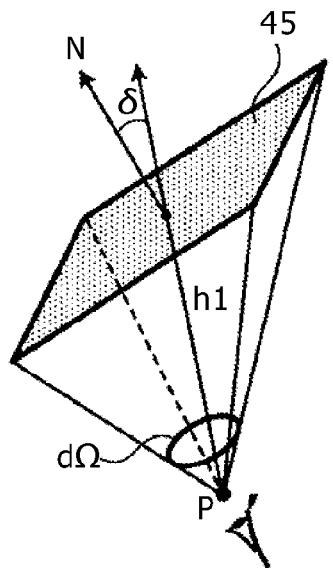
FIGS. 13A and 13B are diagrams for describing the solid angle effect considered in the simulator according to the second embodiment.
Figure 13B:
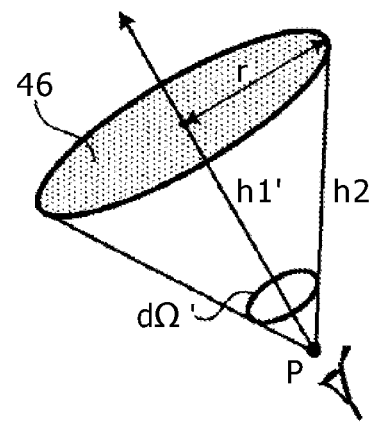

FIGS. 13A and 13B illustrate the outline of the solid angle conversion method. FIG. 13A is a diagram illustrating a solid angle $d\Omega$ at the evaluation point P when a plane 45 of the field-of-view region is rectangular (before the conversion). On the other hand, FIG. 13B is a diagram illustrating a solid angle $d\Omega'$ at the evaluation point P when the rectangular plane 45 of the field-of-view region is converted into a circular plane 46 having the same area (after the conversion).

Here, in FIG. 13A, we assume the distance from the evaluation point P to the center of the rectangular plane 45 to be denoted by 'h1' and the angle between the direction from the evaluation point P to the center of the plane 45 and the direction of the normal of the plane 45 (normal vector N) to be denoted by '$\delta$.' Further, we assume the distance from the evaluation point P to the center of the circular plane 46 to be denoted by 'h1'' and the distance from the evaluation point P to the outer periphery of the plane 46 to be denoted by 'h2.' Still further, we assume the radius of the circular plane 46 in FIG. 13B to be denoted by 'r.'

If the geometric conditions shown in FIGS. 13A and 13B hold between the rectangular plane 45 and circular plane 46 serving as field-of-view regions and the evaluation point P, the solid angle $d\Omega'$ at the evaluation point P after the conversion is expressed by Formula (15) shown below.

$$d\Omega' = \pi(1 - \cos\phi) \quad (15)$$

$$\cos\phi = \frac{h1'}{h2} = \frac{h1 \times \cos\delta}{(r^2 + h1'^2)^{0.5}}$$

In the present embodiment, the solid angle $d\Omega 1$ of the rectangular field-of-view region obstructed by the one side wall surface 41b as seen from the evaluation point P is converted into the solid angle $d\Omega 1'$ of the circular field-of-view region having the same area as the rectangular field-of-view region by using Formula (15) shown above. Similarly, the solid angle $d\Omega 2$ of the rectangular field-of-view region obstructed by the other side wall surface 41c as seen from the evaluation point P is converted into the solid angle $d\Omega 2'$ of the circular field-of-view region having the same area as the rectangular field-of-view region.

Next, the solid angle $d\Omega 0'$ at the evaluation point P used for the simulation is calculated by using Formula (16) shown below and the solid angles $d\Omega 1'$ and $d\Omega 2'$ calculated by using Formula (15) shown above.

$$d\Omega 0' = 2\pi - d\Omega 1' - d\Omega 2' \quad (16)$$

Then, in the present embodiment, the flux $\Gamma'$ of each of the reaction particles reaching the evaluation point P from the plasma are calculated by using Formula (17) shown below and the solid angle $d\Omega 0'$ at the evaluation point P calculated by using Formula (16).

$$\Gamma' = \frac{d\Omega 0'}{2\pi}\Gamma \quad (17)$$

In Formula (17), "$\Gamma$" is the total flux of each of the reaction particles injected from the plasma onto the workpiece 40. That is, in the present embodiment, the total flux $\Gamma$ of the reaction particle injected from the plasma onto the workpiece 40 is multiplied by the ratio of the solid angle $d\Omega 0'$ to the overall solid angle ($2\pi$) at the evaluation point P, thus calculating the flux $\Gamma'$ of the reaction particle reaching the evaluation point P. The solid angle effect at the evaluation point P is calculated as described above in the present embodiment.

Figure 14:
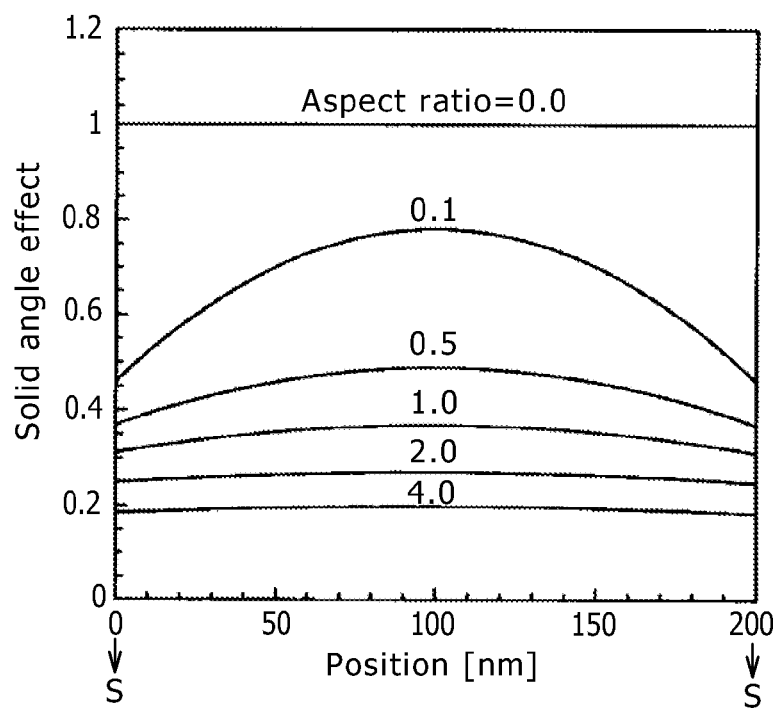
FIG. 14 is a diagram illustrating an example of characteristics of the solid angle effect.
Figure 15A:
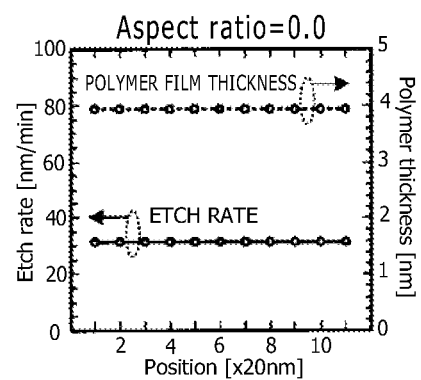
FIGS. 15A to 15D are diagrams illustrating the results of evaluation example 5.
Figure 15B:
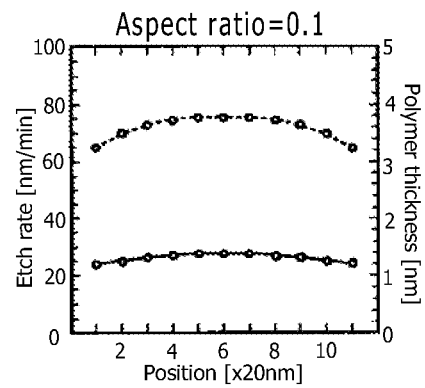
Figure 15C:
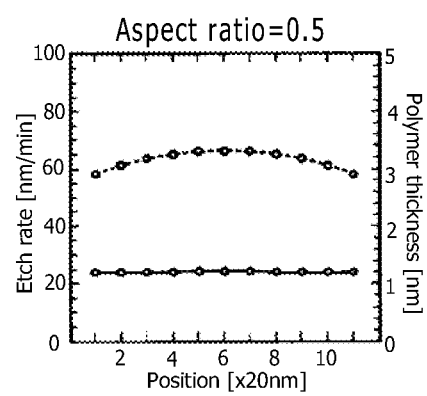
Figure 15D:
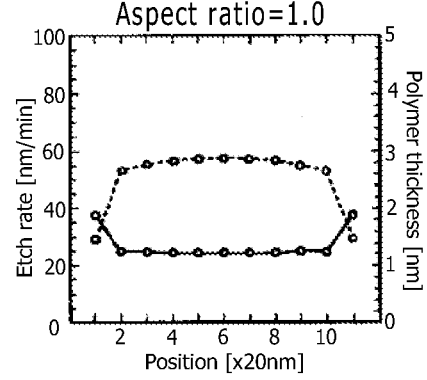
Figure 17A:
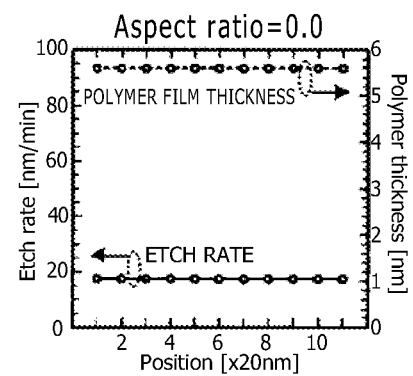
FIGS. 17A to 17D are diagrams illustrating the results of evaluation example 5.
Figure 17B:
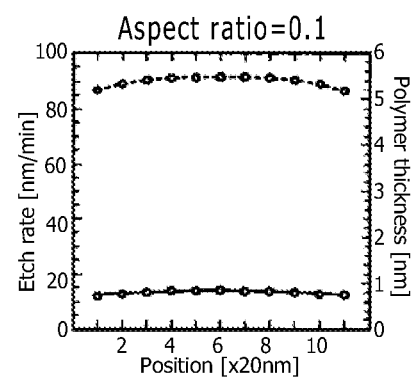
Figure 17C:
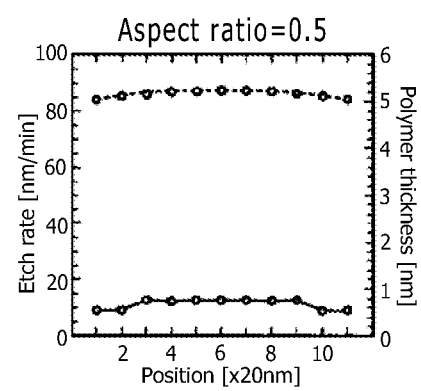
Figure 17D:
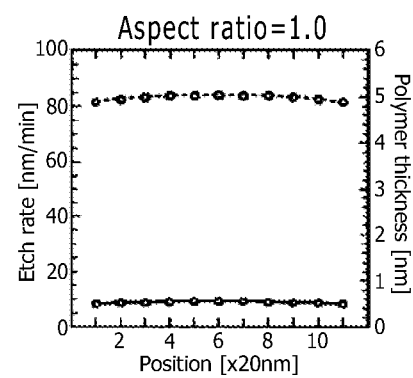
Figure 19A:
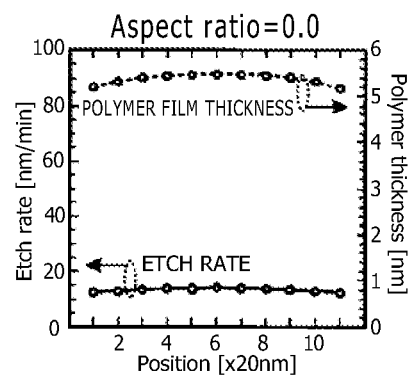
FIGS. 19A to 19D are diagrams illustrating the results of evaluation example 6.
Figure 19B:
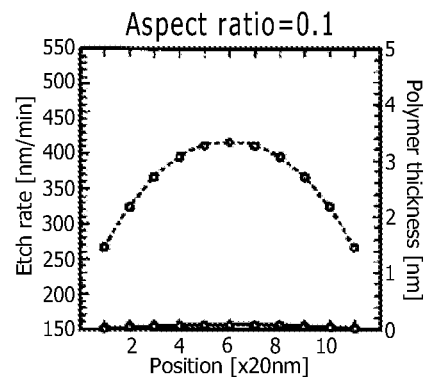
Figure 19C:
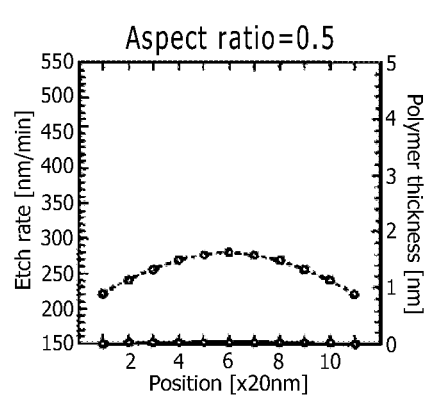
Figure 19D:
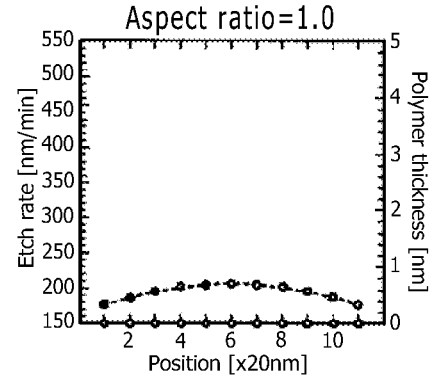
Figure 20A:
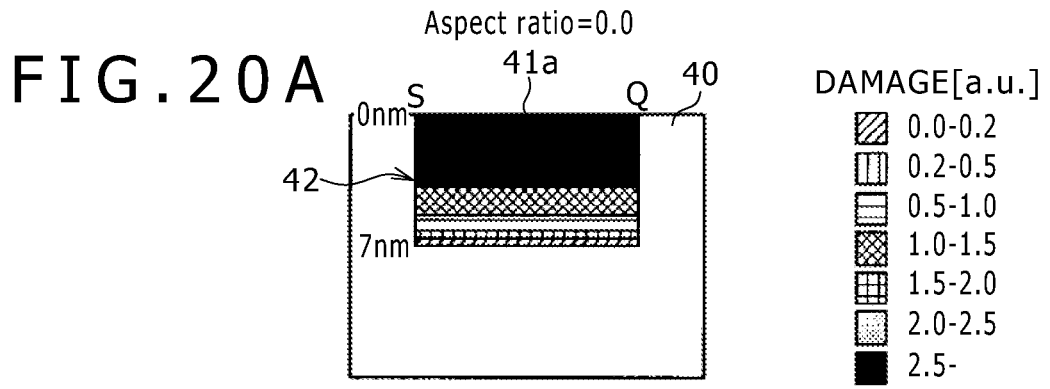
FIGS. 20A to 20D are diagrams illustrating the results of evaluation example 6.
Figure 20B:
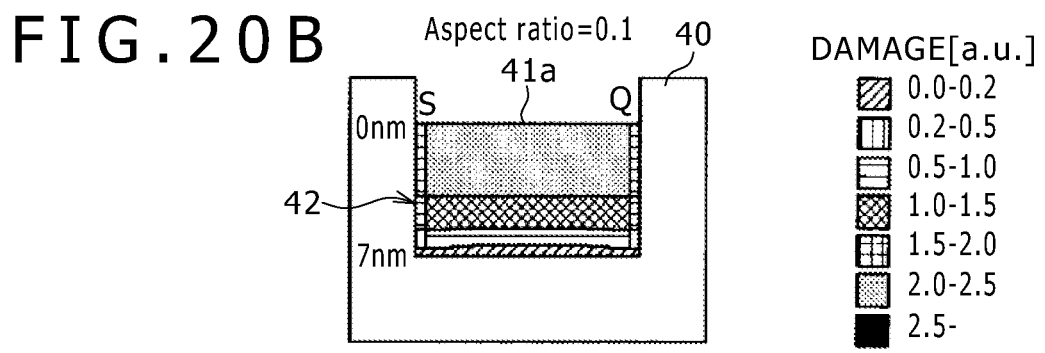
Figure 20C:
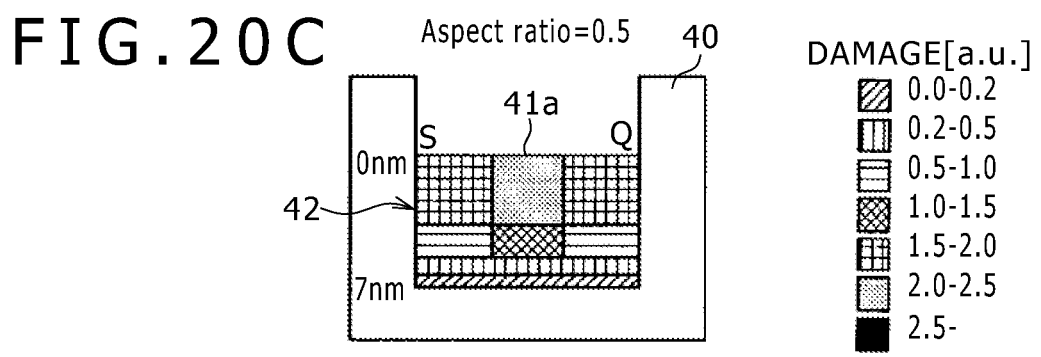
Figure 20D:
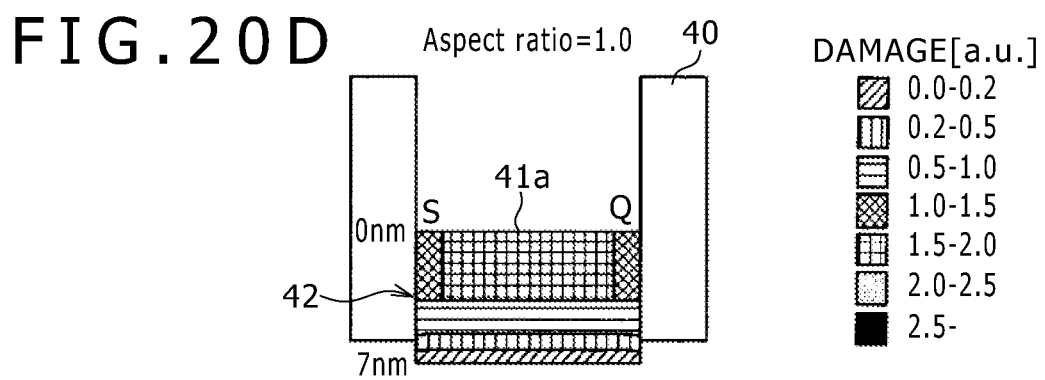
Figure 21A:
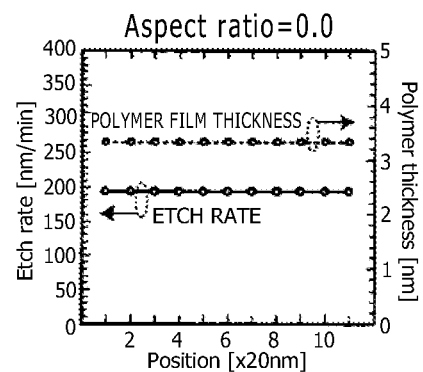
FIGS. 21A to 21D are diagrams illustrating the results of evaluation example 6.
Figure 21B:
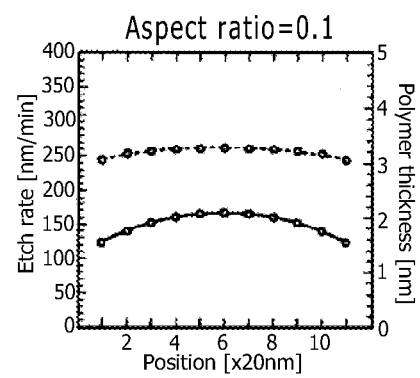
Figure 21C:
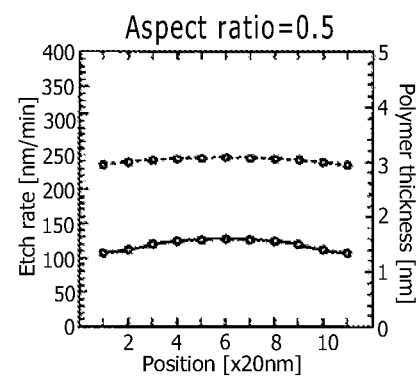
Figure 21D:
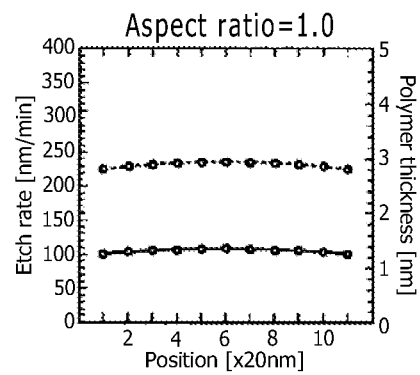
Figure 22A:
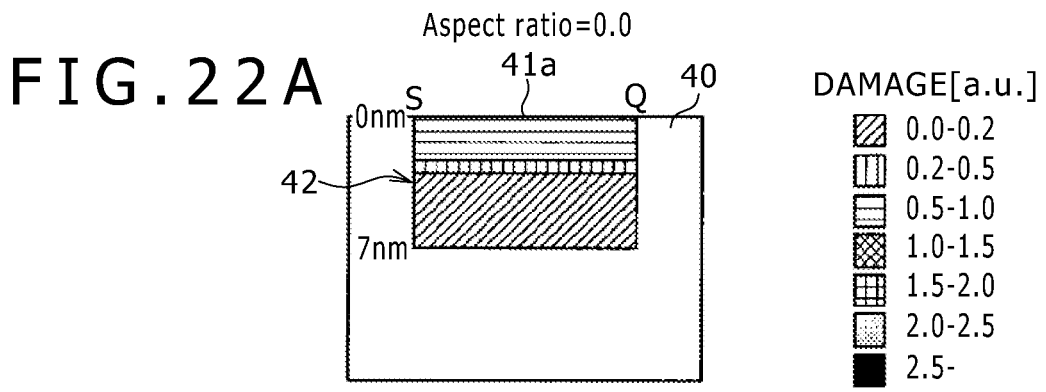
FIGS. 22A to 22D are diagrams illustrating the results of evaluation example 6.
Figure 22B:
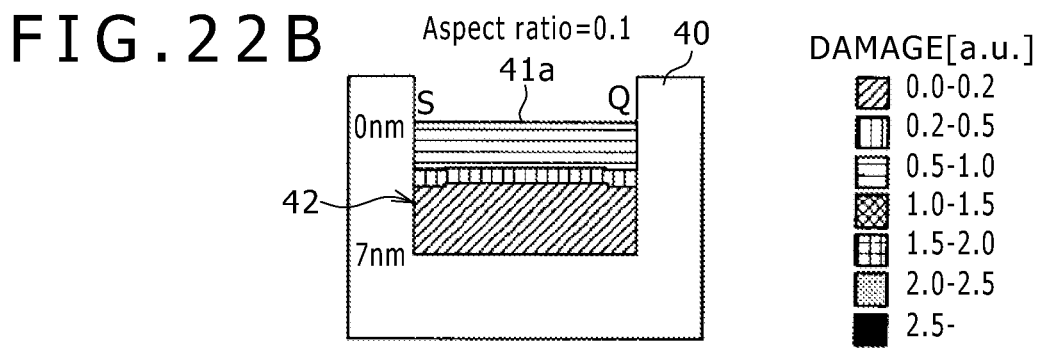
Figure 22C:
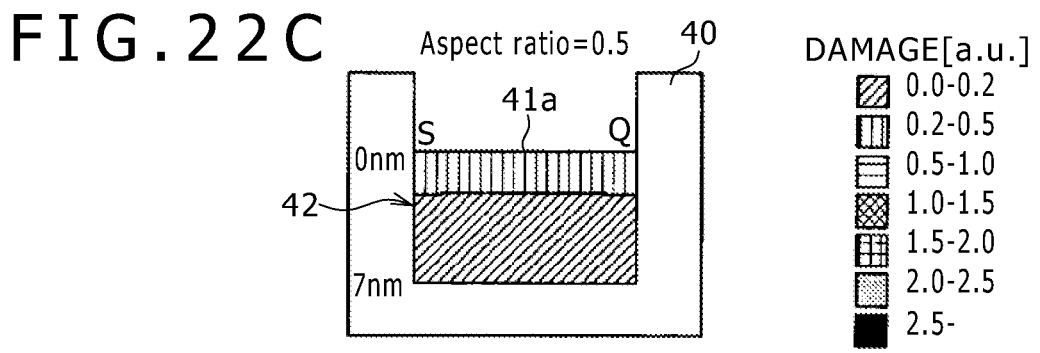
Figure 22D:
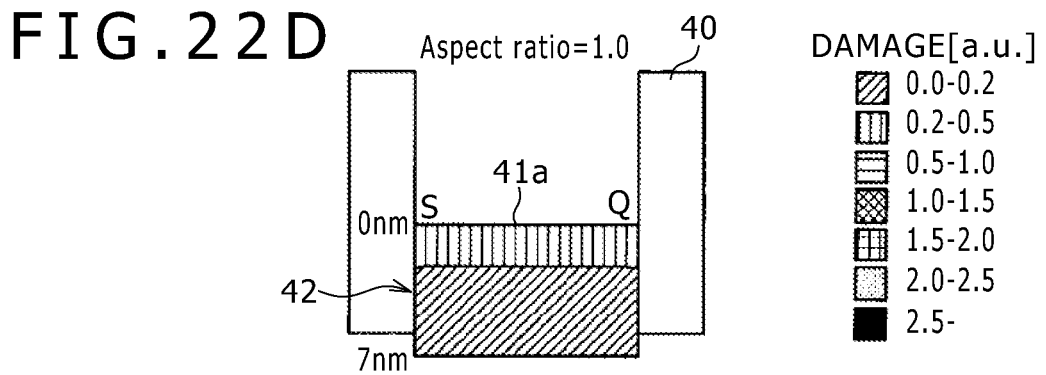

Here, FIG. 14 illustrates the relationship between the position of the evaluation point P on the bottom surface 41a of the groove portion 41 and the ratio of the solid angle $d\Omega 0'$ to the overall solid angle ($2\pi$) at the evaluation point P ($d\Omega 0'/2\pi$: hereinafter referred to as the solid angle effect value). The characteristics shown in FIG. 14 are those of the change in solid angle effect value on the line segment XP (between the points S and Q) in FIG. 12A, with the horizontal axis representing the position on the line segment XP and the vertical axis representing the solid angle effect value.

Further, the characteristics shown in FIG. 14 are those obtained when the width of the groove portion 41 (length of the line segment XP) is 200 nm and the length of extension of the groove portion 41 is 1000 nm (refer to FIG. 12A). Still further, FIG. 14 illustrates the characteristics when the depth of the groove portion 41 is varied, that is, when the aspect ratio (depth/width) of the groove portion 41 is varied.

As is obvious from FIG. 14, the greater the depth (aspect ratio) of the groove portion 41, the smaller the solid angle effect value ($d\Omega 0'/2\pi$). That is, the greater the depth (aspect ratio) of the groove portion 41, the less the flux $\Gamma'$ of each of the reaction particles reaching the evaluation point P from the plasma.

It should be noted that the workpiece 40 having the groove portion 41 formed on its surface has been taken as an example in the present embodiment, the present disclosure is not limited thereto. The present disclosure is applicable to a workpiece having an arbitrary pattern of projections and depressions formed on its surface. In this case, it is only necessary to calculate, as appropriate, the solid angle effect at the evaluation point for each of the patterns of the region to be evaluated in the same manner as the principles described above.

[Simulator Configuration and Damage Calculation Method]

The simulator according to the present embodiment can be configured in the same manner as the simulator 10 according to the first embodiment shown in FIG. 1. It should be noted, however, that the calculation of the fluxes $\Gamma'$ of various reaction particles factoring in the solid angle effect described above is handled by the damage calculation section 12. On the other hand, information about the structure surrounding the evaluation point, i.e., information about the surface shape of the region to be evaluated, is supplied externally as with the processing conditions.

It should be noted that the solid angle effect value $d\Omega 0'/2\pi$ may be calculated by the damage calculation section 12 every simulation run based on the supplied information about the surface shape of the region to be evaluated. Alternatively, characteristic data (characteristics shown in FIG. 14) of the solid angle effect values associated with the surface shapes of various regions to be evaluated may be calculated and stored in advance in the database section 13. In this case, the damage calculation section 12 searches the database section 13 every simulation run, thus acquiring solid angle effect data for the supplied information about the surface shape of the region to be evaluated.

Further, the present embodiment allows for calculation of the damage distribution at an arbitrary evaluation point in the same manner as the calculation method (calculation principle) described in the first embodiment except that the fluxes $\Gamma'$ of various reaction particles reflecting the solid angle effect are used to calculate the damage distribution. It should be noted that the solid angle effect may be calculated, for example, prior to step S3 (process step adapted to divide the reactive layer into a plurality of slabs) in the flowchart of the damage calculation in the first embodiment shown in FIG. 6.

[Various Examples of Evaluation]

A description will be given next of various examples of evaluation performed using the simulator according to the present embodiment. It should be noted here that a description will be given below of evaluation examples of the workpiece 40 shown in FIGS. 12A and 12B, i.e., the workpiece 40 that is 200 nm in width (length of the line segment XP) and that has the groove portion 41 with a length of extension of 1000 nm formed on its surface.

In the various evaluation examples described below, the etch rate ER, polymer film thickness T and damage distribution at the time of dry-etching of the groove portion 41 of the workpiece 40 using a CF-based gas were calculated by using the simulation method described above. At this time, the various evaluation parameters (etch rate ER, polymer film thickness T and damage distribution) were calculated by varying the aspect ratio of the groove portion 41 to four different levels, namely, 0.0, 0.1, 0.5 and 1.0. Further, in the various evaluation examples described below, the various evaluation parameters were calculated at the evaluation points located at various positions on the line segment XP of the bottom surface 41a of the groove portion 41. Then, the characteristics of change in these evaluation parameters on the line segment XP were found.

(1) Evaluation Example 5

In evaluation example 5, a description will be given below of a case in which a Si film was formed on the bottom surface 41a of the groove portion 41, and the Si film was dry-etched in a mixture gas of $C_4F_8$ (CF-based gas), argon (Ar) and oxygen ($O_2$).

It should be noted that the process conditions in evaluation example 5 are as follows. The flow rates of argon (Ar) and oxygen ($O_2$) were maintained constant respectively at 400 sccm and 8 sccm. The gas pressure in the chamber was set at 30 mT, and the incident ion energy E of the ion particle 23 was 1450 V. Further, the etching time t0 was 30 seconds.

The initial thickness L of each of the slabs 21b of the reactive layer under the bottom surface 41a was 0.5 nm, and the maximum penetration depth Dp of the ion particle 23 was 7 nm. It should be noted that the measured values obtained in the same manner as in evaluation example 1 described above were, for example, used as the fluxes $\Gamma$ of various reaction particles used for simulation calculations.

First, in evaluation example 5, various evaluation parameters of the groove portion 41 and the characteristics of change in these evaluation parameters on the line segment XP were calculated under the above simulation conditions, and additionally with the flow rate of $C_4F_8$ set at 11 sccm. That is, various evaluation parameters of the groove portion 41 and the characteristics of change in these evaluation parameters were calculated under conditions of a high etch rate and the small polymer film thickness T (low deposition conditions). FIGS. 15A to 15D and FIGS. 16A to 16D illustrate the calculation results.

FIGS. 15A to 15D illustrate the characteristics of change in the etch rate ER and polymer film thickness T on the bottom surface 41a of the groove portion 41 (on the line segment XP), with the horizontal axis representing the position on the line segment XP and the vertical axes representing the etch rate ER and polymer film thickness T. It should be noted that the characteristics shown in FIGS. 15A to 15D are those obtained when the aspect ratio of the groove portion 41 was set to four different levels, namely, 0.0, 0.1, 0.5 and 1.0. Further, the characteristic shown by a solid line in each of FIGS. 15A to 15D is that of the etch rate ER, and the characteristic shown by a dashed line is that of the polymer film thickness T. Still further, position 1 (×20 nm) on the horizontal axis in each of FIGS. 15A to 15D is the point S at one end of the line segment XP, and position 11 (×20 nm) on the horizontal axis is the point Q at the other end of the line segment XP.

As is obvious from FIGS. 15A to 15D, the larger the aspect ratio of the groove portion 41, the smaller the etch rate ER and polymer film thickness T became near the center of the bottom surface 41a. Further, in the results shown in FIGS. 15B and 15C, the etch rate ER and polymer film thickness T near the wall surfaces on the bottom surface 41a were smaller than those near the center of the bottom surface 41a.

On the other hand, FIGS. 16A to 16D are damage distribution diagrams on the bottom surface 41a of the groove portion 41 (on the line segment XP). It should be noted that FIGS. 16A to 16D illustrate, respectively, the characteristics when the aspect ratio of the groove portion 41 was set to 0.0, 0.1, 0.5 and 1.0.

As is obvious from FIGS. 16A to 16D, it has been discovered that the damage distribution in the reactive layer 42 under the bottom surface 41a changes with change in the etch rate ER and polymer film thickness T relative to the aspect ratio of the groove portion 41.

Next, in evaluation example 5, various evaluation parameters of the groove portion 41 and the characteristics of change in these evaluation parameters on the line segment XP were calculated under the above simulation conditions, and additionally with the flow rate of $C_4F_8$ set at 33 sccm. That is, various evaluation parameters of the groove portion 41 and the characteristics of change in these evaluation parameters on the line segment XP were calculated under conditions of a low etch rate and the large polymer film thickness T (high deposition conditions). FIGS. 17A to 17D and FIGS. 18A to 18D illustrate the calculation results.

FIGS. 17A to 17D illustrate the characteristics of change in the etch rate ER and polymer film thickness T on the bottom surface 41a of the groove portion 41 (on the line segment XP), with the horizontal axis representing the position on the line segment XP and the vertical axes representing the etch rate ER and polymer film thickness T. It should be noted that the characteristics shown in FIGS. 17A to 17D are those obtained when the aspect ratio of the groove portion 41 was set to four different levels, namely, 0.0, 0.1, 0.5 and 1.0. Further, the characteristic shown by a solid line in each of FIGS. 17A to 17D is that of the etch rate ER, and the characteristic shown by a dashed line is that of the polymer film thickness T. Still further, position 1 (×20 nm) on the horizontal axis in each of FIGS. 17A to 17D is the point S at one end of the line segment XP, and position 11 (×20 nm) on the horizontal axis is the point Q at the other end of the line segment XP.

As is obvious from FIGS. 17A to 17D, the larger the aspect ratio of the groove portion 41, the smaller the etch rate ER and polymer film thickness T became near the center of the bottom surface 41a also under the high deposition conditions as with the results shown in FIGS. 15A to 15D. Further, in the results shown in FIGS. 17B to 17D, the etch rate ER and polymer film thickness T near the wall surfaces on the bottom surface 41a were smaller than those near the center of the bottom surface 41a.

On the other hand, FIGS. 18A to 18D are damage distribution diagrams on the bottom surface 41a of the groove portion 41 (on the line segment XP). It should be noted that FIGS. 18A to 18D illustrate, respectively, the characteristics when the aspect ratio of the groove portion 41 was set to 0.0, 0.1, 0.5 and 1.0.

As is obvious from FIGS. 18A to 18D, it has been discovered that the damage distribution in the reactive layer 42 under the bottom surface 41a also changes under the high deposition conditions with change in the etch rate ER and polymer film thickness T relative to the aspect ratio of the groove portion 41.

It is clear from the results of evaluation example 5 shown above that the simulator according to the present embodiment can quantitatively predict the change in damage distribution that is likely to take place with increase in the aspect ratio of the groove portion 41 during etching of the groove portion 41 having a Si film formed on the bottom surface 41a.

(2) Evaluation Example 6

A description will be given below of a case in which a $SiO_2$ film was formed on the bottom surface 41a of the groove portion 41, and the $SiO_2$ film was dry-etched in a mixture gas of $C_4F_8$ (CF-based gas), argon (Ar) and oxygen ($O_2$).

It should be noted that the various simulation conditions (process conditions and initial conditions of the calculation parameters) were the same as those in evaluation example 5 described above except that the type of film formed on the bottom surface 41a of the groove portion 41 was changed. Further, the measured values were used as the fluxes Γ of various reaction particles used for simulation calculations as in evaluation example 5.

First, in evaluation example 6, various evaluation parameters of the groove portion 41 and the characteristics of change in these evaluation parameters on the line segment XP were calculated under the above simulation conditions, and additionally with the flow rate of $C_4F_8$ set at 11 sccm. FIGS. 19A to 19D and FIGS. 20A to 20D illustrate the calculation results.

FIGS. 19A to 19D illustrate the characteristics of change in the etch rate ER and polymer film thickness T on the bottom surface 41a of the groove portion 41 (on the line segment XP), with the horizontal axis representing the position on the line segment XP and the vertical axes representing the etch rate ER and polymer film thickness T. It should be noted that the characteristics shown in FIGS. 19A to 19D are those obtained when the aspect ratio of the groove portion 41 was set to four different levels, namely, 0.0, 0.1, 0.5 and 1.0. Further, the characteristic shown by a solid line in each of FIGS. 19A to 19D is that of the etch rate ER, and the characteristic shown by a dashed line is that of the polymer film thickness T. Still further, position 1 (×20 nm) on the horizontal axis in each of FIGS. 19A to 19D is the point S at one end of the line segment XP, and position 11 (×20 nm) on the horizontal axis is the point Q at the other end of the line segment XP.

As is obvious from FIGS. 19A to 19D, the larger the aspect ratio of the groove portion 41, the smaller the etch rate ER and polymer film thickness T became near the center of the bottom surface 41a. Further, in the results shown in FIGS. 19B to 19D, the etch rate ER and polymer film thickness T near the wall surfaces on the bottom surface 41a were smaller than those near the center of the bottom surface 41a.

On the other hand, FIGS. 20A to 20D are damage distribution diagrams on the bottom surface 41a of the groove portion 41 (on the line segment XP). It should be noted that FIGS. 20A to 20D illustrate, respectively, the characteristics when the aspect ratio of the groove portion 41 was set to 0.0, 0.1, 0.5 and 1.0.

As is obvious from FIGS. 20A to 20D, it has been discovered that the damage distribution in the reactive layer 42 under the bottom surface 41a changes with change in the etch rate ER and polymer film thickness T relative to the aspect ratio of the groove portion 41.

Next, in evaluation example 6, various evaluation parameters of the groove portion 41 and the characteristics of change in these evaluation parameters on the line segment XP were calculated under the above simulation conditions, and additionally with the flow rate of $C_4F_8$ set at 33 sccm (high deposition conditions). FIGS. 21A to 21D and FIGS. 22A to 22D illustrate the calculation results.

FIGS. 21A to 21D illustrate the characteristics of change in the etch rate ER and polymer film thickness T on the bottom surface 41a of the groove portion 41 (on the line segment XP), with the horizontal axis representing the position on the line segment XP and the vertical axes representing the etch rate ER and polymer film thickness T. It should be noted that the characteristics shown in FIGS. 21A to 21D are those obtained when the aspect ratio of the groove portion 41 was set to four different levels, namely, 0.0, 0.1, 0.5 and 1.0. Further, the characteristic shown by a solid line in each of FIGS. 21A to 21D is that of the etch rate ER, and the characteristic shown by a dashed line is that of the polymer film thickness T. Still further, position 1 (×20 nm) on the horizontal axis in each of FIGS. 21A to 21D is the point S at one end of the line segment XP, and position 11 (×20 nm) on the horizontal axis is the point Q at the other end of the line segment XP.

As is obvious from FIGS. 21A to 21D, the larger the aspect ratio of the groove portion 41, the smaller the etch rate ER and polymer film thickness T became near the center of the bottom surface 41a also under the high deposition conditions as with the results shown in FIGS. 19A to 19D. Further, in the results shown in FIGS. 21A to 21D, the etch rate ER and polymer film thickness T near the wall surfaces on the bottom surface 41a were smaller than those near the center of the bottom surface 41a.

On the other hand, FIGS. 22A to 22D are damage distribution diagrams on the bottom surface 41a of the groove portion 41 (on the line segment XP). It should be noted that FIGS. 22A to 22D illustrate, respectively, the characteristics when the aspect ratio of the groove portion 41 was set to 0.0, 0.1, 0.5 and 1.0.

As is obvious from FIGS. 22A to 22D, it has been discovered that the damage distribution in the reactive layer 42 under the bottom surface 41a also changes under the high deposition conditions with change in the etch rate ER and polymer film thickness T relative to the aspect ratio of the groove portion 41.

It is clear from the results of evaluation example 6 shown above that the simulator according to the present embodiment can quantitatively predict the change in damage distribution that is likely to take place with increase in the aspect ratio of the groove portion 41 during etching of the groove portion 41 having a $SiO_2$ film formed on the bottom surface 41a.

Further, it is clear from the evaluation results of damage distribution shown in evaluation examples 5 and 6 described above that the damage sustained by a $SiO_2$ film etched with a CF-based gas is several-fold greater than that sustained by a Si film etched with a CF-based gas. This result is also a probable characteristic obtained when a $SiO_2$ film is etched with a CF-based gas, and it has been discovered that this characteristic can also be expressed quantitatively by the simulator according to the present embodiment.

As described above, the simulator and damage evaluation method according to the present embodiment allow for prediction (evaluation) of the damage distribution for each pattern even if the region of the workpiece to be evaluated for damage has a pattern of projections and depressions. Therefore, the present embodiment allows for theoretical prediction, in a shorter period of time and with higher accuracy, of the damage distribution of an extremely small pattern region that is difficult to observe with ordinary methods using cross-sectional SEM (Scanning Electron Microscope) and TEM.

Further, the present embodiment can predict (evaluate) the pattern dependence of damage, thus contributing to reduced variations in device characteristics and providing improved reliability. Still further, the simulator and damage evaluation method according to the present embodiment contributes to shorter development TAT (Turn-around Time) and reduced prototype wafers, thus providing reduced cost.

Still further, the simulator and damage evaluation method according to the present embodiment calculate the damage distribution of a workpiece using the Flux method as in the first embodiment, thus providing the same advantageous effect as in the first embodiment.

From the above, the simulator according to the present embodiment is extremely effective as a tool for accurately predicting the process dependence and pattern dependence of damage in designing devices that will become even smaller.

<3. Third Embodiment>

Normally, if the surface of a workpiece is subjected to a process such as etching, the surface shape of the workpiece changes with the processing time. In order to calculate the change in the surface shape of the workpiece, shape evolution models have been proposed, for example, using the string method, level set method and cell removal method. In order to evaluate, in detail, the damage sustained by a workpiece when the workpiece is subjected to a process such as etching, it is preferred to build an evaluation system that includes a damage distribution calculation model and shape evolution model combined (connected) together.

However, the damage distribution calculation models using the particle method (e.g., molecular dynamics calculation method) in related art lead to an enormous amount of calculations, thus making it difficult to use these models in combination with a shape evolution model. In contrast, the damage distribution calculation model according to the embodiments described above use the Flux method, thus contributing to a significantly smaller amount of calculations than those using the particle method. This makes it easier to use the damage distribution calculation model according to the above embodiments in combination with a shape evolution model.

In the third embodiment, a description will be given below of a simulation system (simulator) that includes the damage distribution calculation model according to the embodiments described above and a shape evolution model connected together, and an example of the damage evaluation method.

[Outline of the Combined Model]

Figure 23:
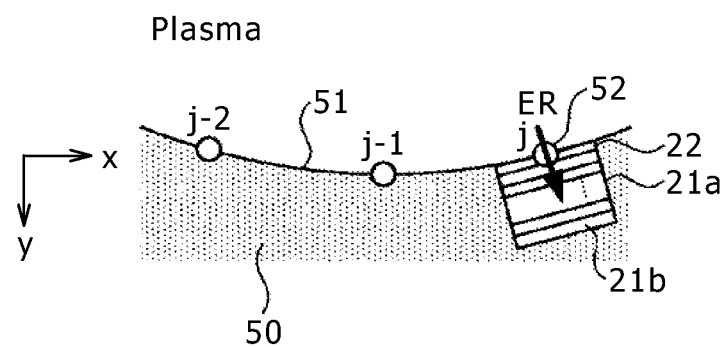
FIG. 23 is a diagram illustrating the outline of a combined model combining a damage calculation model and shape evolution model used in a simulation system according to a third embodiment of the present disclosure.

FIG. 23 illustrates the schematic outline of a combined model combining the damage distribution calculation model according to the above embodiments and a shape evolution model. In the present embodiment, a description will be given of an example in which a shape evolution model based on the string method is used. It should be noted that the present disclosure is not limited thereto. Instead, an arbitrary shape evolution model based, for example, on the level set method or cell removal method may be used.

In the shape evolution model based on the string method, lattice points are arranged at a given spacing of 1 nm or so in the initial shape of a surface to be processed 51 of a workpiece 50. Alternatively, the initial shape is divided into cells each having a given spatial resolution of 1 nm or so. In the example shown in FIG. 23, lattice points 52 are arranged (set) at a given spacing on the surface to be processed 51 of the workpiece 50. Then, in the combined model according to the present embodiment, the damage distribution calculation model according to the above embodiments is applied at each of the lattice points 52 (each of the evaluation points). That is, the polymer layer 22 and the reactive layer 21a, divided into the plurality of slabs 21b, are set at each of the lattice points 52 as illustrated in FIG. 23.

It should be noted that, in the shape evolution model based on the string method, the coordinates of each of the lattice points 52 (or cells) that move on the surface to be processed 51 with time as a result of etching or other process are calculated, thus calculating the change in shape of the surface to be processed 51. For example, the movement of the coordinates of the lattice point 52 having an index j in FIG. 23 is calculated by using Formula (18) shown below.

$$x_j(t)=x_j(t-1)+ER_{jx}(t-1)\times dt$$

$$y_j(t)=y_j(t-1)+ER_{jy}(t-1)\times dt \quad (18)$$

"$ER_{jy}(t)$" in Formula (18) shown above is the etch rate component in the direction of depth (y direction in FIG. 23) of the workpiece 50 of the etch rate ER(t) at the lattice point j. On the other hand, "$ER_{jx}(t)$" is the etch rate component in the direction orthogonal to the direction of depth (x direction in FIG. 23: hereinafter referred to as the horizontal direction) of the etch rate ER(t) at the lattice point j.

The etch rate ER(t) at the lattice point 52 having the index j is calculated using the damage distribution calculation model described in the above embodiments. On the other hand, the etching direction (bold solid line arrow in FIG. 23) at the lattice point 52 having the index j can be calculated by the change in the coordinates of the lattice point 52 over time (displacement) calculated by using Formula (18). Therefore, "$ER_{jy}(t)$" and "$ER_{jx}(t)$" in Formula (18) shown above can be calculated from the etch rate ER(t) calculated using the damage distribution calculation model and displacement of the coordinates of each of the lattice points 52.

[Configuration of the Simulation System]

Figure 24:
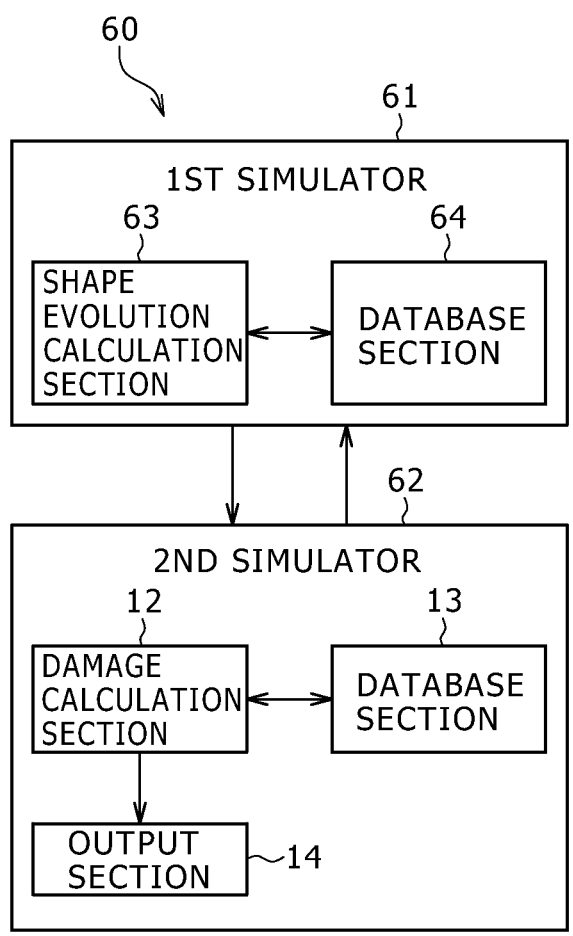
FIG. 24 is a schematic block configuration diagram of the simulation system according to the third embodiment.

A description will be given next of a configuration example of the simulation system for implementing the above combined model. FIG. 24 illustrates a schematic block configuration of the simulation system (simulator) according to the present embodiment. It should be noted that the input section 11 is not shown in a second simulator 62 in FIG. 24 to facilitate the description.

A simulation system 60 includes a first simulator 61 and the second simulator 62. The first simulator 61 calculates the change in shape of the surface to be processed 51 with time (hereinafter referred to as the shape evolution). The second simulator 62 calculates the damage distribution at each of the lattice points 52 (or cells) set on the surface to be processed 51.

The first simulator 61 includes a shape evolution calculation section 63 and a database section 64 that is connected to the shape evolution calculation section 63.

The shape evolution calculation section 63 calculates the shape evolution of the surface to be processed 51 based on Formula (18) shown above. Further, the shape evolution calculation section 63 acquires the etch rate ER(t) at each of the lattice points 52 calculated by the second simulator 62. Then, the shape evolution calculation section 63 calculates the etch rate component $ER_{jy}(t)$ in the direction of depth of the workpiece 50 and the etch rate component $ER_{jx}(t)$ in the horizontal direction at each of the lattice points 52 based on the etch rate ER(t) and the calculation results of shape evolution (coordinate displacement).

Still further, the shape evolution calculation section 63 outputs the calculation results of the shape evolution of the surface to be processed 51 and the etch rate components at each of the lattice points 52 to the database section 64. These various pieces of data are used when the shape evolution is calculated the next time. It should be noted that, at this time, the shape evolution calculation section 63 may output the calculation results of the shape evolution of the surface to be processed 51 to the second simulator 62 so that the manner in which the shape of the surface to be processed 51 changes is displayed on the output section 14 of the second simulator 62.

In order to calculate the shape evolution of the surface to be processed 51, the shape evolution calculation section 63 externally acquires the initial conditions such as the initial shape of the surface to be processed 51, the spacing between the lattice points 52 (cells) and calculation step Δt via the second simulator 62 or directly therefrom. Further, at this time, the shape evolution calculation section 63 acquires the past calculation result data such as the coordinates of each of the lattice points 52 and etch rate from the database section 64.

It should be noted that, in the present embodiment, the shape evolution calculation section 63 may include hardware to perform various calculations for the shape evolution of the surface to be processed 51. Alternatively, however, a given program (software) may be used to perform various calculations for the shape evolution. In this case, the shape evolution calculation section 63 includes a CPU (Central Processing Unit) or other processor that externally loads a shape evolution calculation program (shape evolution program) and executes the program to perform various shape evolution calculations.

On the other hand, the shape evolution program may be stored, for example, in the database section 64 or a separate storage section such as ROM. At this time, the shape evolution program may be, for example, installed in advance in the database section 64 or separate storage section. Alternatively, the program may be, for example, externally installed into the database section 64 or separate storage section. It should be noted that if the shape evolution program is externally acquired, the program may be distributed in a media such as optical disk or semiconductor memory. Alternatively, the program may be downloaded via a transmission section such as the Internet.

The database section 64 stores data such as various parameters necessary for shape evolution calculations. For example, the database section 64 stores shape evolution data of the surface to be processed 51 calculated by the shape evolution calculation section 63, the etch rate of each of the lattice points 52 and various etch rate components.

The second simulator 62 includes the input section 11 (not shown in FIG. 24), damage calculation section 12, database section 13 and output section 14. The second simulator 62 according to the present embodiment is configured in the same manner as the simulator 10 described in the first embodiment (FIG. 1). Therefore, the description of each of the sections of the second simulator 62 will be omitted.

[Damage Distribution Calculation]

Figure 25:
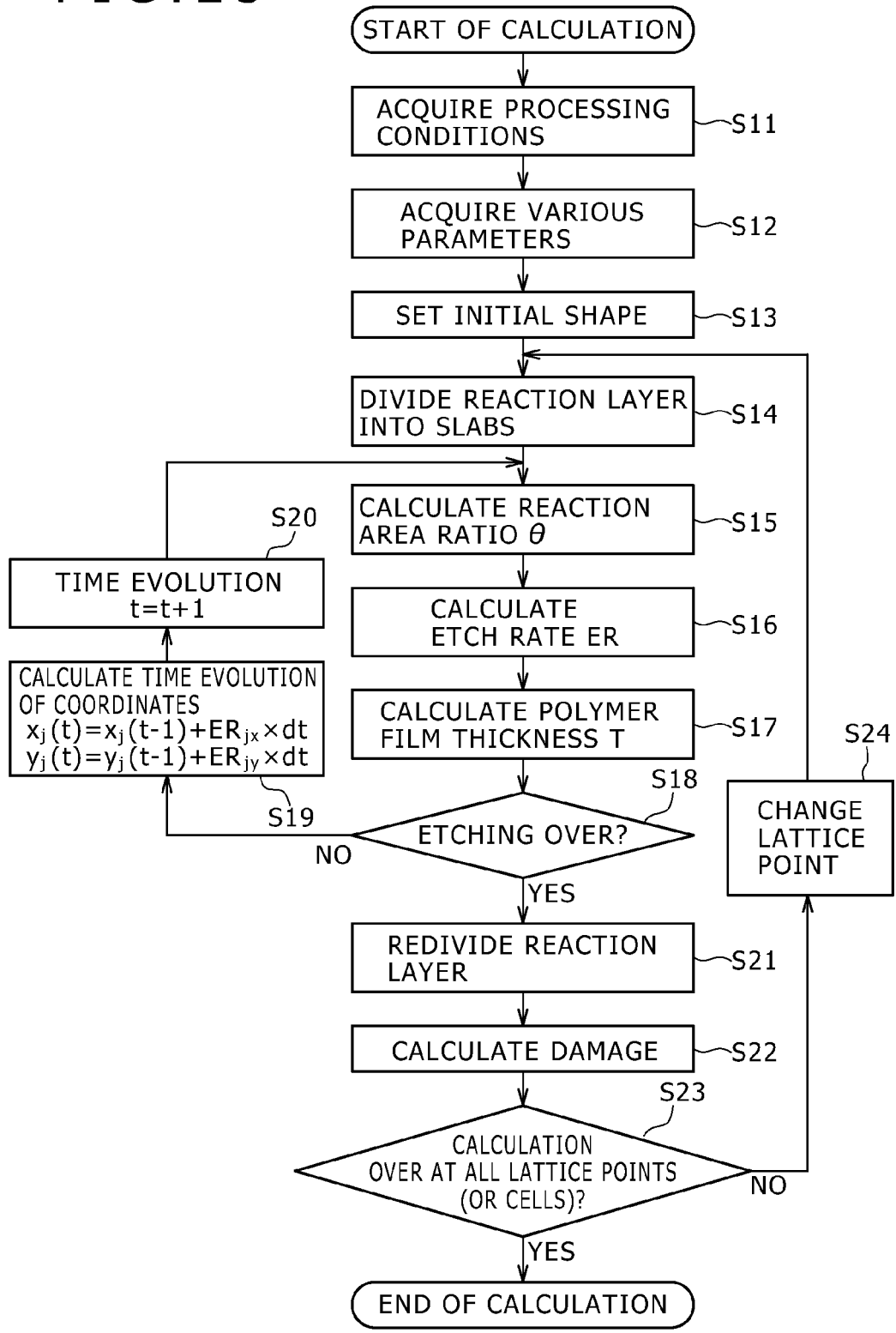
FIG. 25 is a flowchart illustrating the procedure for calculating the damage distribution of a workpiece in the third embodiment.

A description will be given next of the method used by the simulation system 60 according to the present embodiment to evaluate (calculate) the damage distribution of the workpiece 50 with reference to FIG. 25. It should be noted that FIG. 25 is a flowchart illustrating the procedure for calculating the damage distribution in the present embodiment.

First, the simulation system 60 acquires various processing conditions (process conditions and initial conditions of the calculation parameters) supplied externally (step S11). At this time, the first and second simulators 61 and 62 can both externally acquire the processing conditions directly. Alternatively, at this time, one of the first and second simulators 61 and 62 may externally acquire the processing conditions directly so that the other simulator acquires the processing conditions from the one simulator.

It should be noted that, of the processing conditions acquired in step S11, the process conditions are, for example, gas type, gas flow rate, gas pressure, temperature of the workpiece 50, film type of the surface to be processed 51, etching time t0 and incident ion energy E of the ion particle 23. On the other hand, the calculation parameters acquired in step S11 are, for example, the initial thickness L of each of the slabs 21b, the initial value of the polymer film thickness T, the reactive layer 21a and the maximum penetration depth Dp of the ion particle 23.

Next, the damage calculation section 12 of the second simulator 62 searches the database section 13 based on the acquired processing conditions (particularly, gas type, gas flow rate and gas pressure), thus acquiring various parameters necessary for the damage calculations (step S12). Among the various parameters acquired in step S12 are the fluxes Γ of various reaction particles corresponding to the processing conditions, various reaction probabilities and ratios of the components in the gas (e.g., carbon (C)). Further, various parameters such as reaction product parameters during etching and number density and surface density of the film formed on the surface to be processed 51 are acquired in step S12.

It should be noted that if, for example, the measured values of the fluxes Γ of various reaction particles can be acquired externally, the damage calculation section 12 may externally acquire the fluxes Γ of various reaction particles in step S12. On the other hand, not only the fluxes Γ of various reaction particles but also various parameters acquired in step S12 may be directly entered externally. In this case, the process step in step S12 may be omitted so that the various parameters necessary for the damage calculations are acquired in step S11.

Next, the simulation system 60 sets the initial shape of the surface to be processed 51 of the workpiece 50 (step S13). More specifically, the simulation system 60 sets the spacing for arranging the lattice points 52 (or cells) and parameters such as the initial coordinates of each of the lattice points 52.

Next, the simulation system 60 selects the given lattice point 52. Then, the damage calculation section 12 divides the reactive layer 21a into the plurality of slabs 21b at the selected lattice point 52 based on the initial thickness L of the slab 21b, the initial polymer film thickness T and the maximum penetration depth Dp of the ion particle 23 (step S14). More specifically, the damage calculation section 12 equally divides the reactive layer 21a having the depth Dp−T into the plurality of slabs 21b each having the initial thickness L at the selected lattice point 52 as in the first embodiment.

Next, the damage calculation section 12 calculates the reaction area ratio $\theta_k(t)$ of each of the slabs 21b at the given time t at the selected lattice point 52 using the processing conditions and various parameters corresponding to the processing conditions (step S15). More specifically, the damage calculation section 12 calculates the reaction area ratio $\theta_k(t)$ of each of the slabs 21b at the selected lattice point 52 by using Formulas (1) to (4) shown above described in the first embodiment.

Next, the damage calculation section 12 calculates the etch rate ER(t) at time t at the selected lattice point 52 using the reaction area ratio $\theta_k(t)$ of each of the slabs 21b calculated in step S15 (step S16). More specifically, the damage calculation section 12 calculates the etch rate ER(t) at the selected lattice point 52 by using Formulas (5) to (8) shown above described in the first embodiment.

Next, the damage calculation section 12 calculates the polymer film thickness T(t) at time t at the selected lattice point 52 (step S17). More specifically, the damage calculation section 12 calculates the polymer film thickness T(t) using the reaction area ratio $\theta_k(t)$ of each of the slabs 21b and the etch rate ER(t) calculated in steps S15 and S16 and by using Formulas (9) to (12) shown above described in the first embodiment.

Next, the damage calculation section 12 determines whether the current time t has reached the etching end time (step 18). More specifically, the damage calculation section 12 determines whether the elapsed time from the beginning of the calculation has reached the etching time to set in advance.

If time t has yet to reach the etching end time in step S18, the determination in step S18 is No.

In this case, the shape evolution calculation section 63 of the first simulator 61 calculates the coordinates of the selected lattice point 52 (shape evolution of the lattice point 52) (step S19).

More specifically, in step S19, the shape evolution calculation section 63 acquires first the shape evolution calculation results (coordinates [x(t−1), y(t−1)]) at the selected lattice point 52 which is earlier by one calculation step from the database section 64. Further, the shape evolution calculation section 63 acquires the data of the etch rate component $ER_{jy}$(t−1) in the direction of depth and the etch rate component $ER_{jx}$(t−1) in the horizontal direction at the lattice point 52 which are earlier by one calculation step from the database section 64. Next, the shape evolution calculation section 63 calculates coordinates [x(t), y(t)] at time t at the selected lattice point 52 by using the acquired data and Formula (18) shown above.

Then, after calculating the coordinates at time t at the selected lattice point 52, the damage calculation section 12 performs time evolution, that is, updates the calculation time (t=t+Δt) (step S20) and then returns to the process step in step S15. Then, the damage calculation section 12 repeats steps S15 to S20 until the time t reaches the etching end time t0.

On the other hand, when the current time t has reached the etching end time in step S18, the determination in step S18 is Yes.

In this case, the damage calculation section 12 redivides the reactive layer 21a into the plurality of slabs 21b at the selected lattice point 52 in consideration of the ratio (weight) of the contribution rate $ER_k$ of each of the slabs 21b in the etch rate ER at the etching end time (step S21). At this time, the thickness $L_k^*$ of each of the slabs 21b after the redivision is calculated by using Formula (13) described in the first embodiment.

Next, the damage calculation section 12 calculates the damage level of each of the slabs 21b at the selected lattice point 52 (step S22). More specifically, the damage calculation section 12 calculates the damage level damage(k) of each of the slabs 21b by using Formula (14) shown above described in the first embodiment.

Next, the damage calculation section 12 determines whether the damage calculation is over at all the lattice points 52 (or cells) (step S23).

If the damage calculation has yet to be over at all the lattice points 52 (or cells) in step S23, the determination in step S23 is No. In this case, the simulation system 60 changes the selected lattice point 52 (step S24). More specifically, the simulation system 60 updates the index j of the lattice point 52 used for the above series of damage calculations (j=j+1). Then, the simulation system 60 returns to step S14 to repeat steps S14 to S24 until the damage calculation is over at all the lattice points 52.

On the other hand, when the damage calculation is over at all the lattice points 52 (or cells) in step S23, the determination in step S23 is Yes. In this case, the simulation system 60 terminates the damage distribution calculations. In the present embodiment, the damage distribution of the surface to be processed 51 is calculated while at the same time calculating the change in shape of the surface to be processed 51 as described above.

As described above, the simulation system 60 and damage evaluation method according to the present embodiment can predict (evaluate) the damage distribution of a workpiece in consideration of the shape of the workpiece and the change in shape thereof, thus providing the same advantageous effect as in the second embodiment.

Further, in the present embodiment, the damage distribution of a workpiece is calculated by using the Flux method as in the first embodiment, thus providing the same advantageous effect as in the first embodiment.

It should be noted that the solid angle effect calculation described in the second embodiment may be added to the damage evaluation method according to the present embodiment. In this case, the pattern dependence of workpiece damage can be calculated in more detail. In this case, however, the solid angle effect need only be calculated, for example, prior to step S14 (process step adapted to divide the reactive layer into a plurality of slabs) in the flowchart of the damage calculation in the present embodiment shown in FIG. 25.

<4. Fourth Embodiment>

The simulators (or simulation systems) and damage evaluation methods described in the second and third embodiments can predict the damage distribution of a workpiece for each pattern. Therefore, the simulators according to the second and third embodiments can be used as a mask (resist mask) pattern layout setting (prediction) tool that is used to bring the pattern damage down to a given level or less and optimize the damage uniformity in the pattern.

In the fourth embodiment, a description will be given of an example of a process performed when the simulator (simulation system) according to the second or third embodiment is used as a mask pattern layout setting tool. It should be noted that the configuration of the simulator according to the present embodiment is the same as that shown in FIG. 1 or 24. Therefore, the description of the configuration will be omitted here, and only the optimization of the mask pattern layout will be described.

Figure 26:
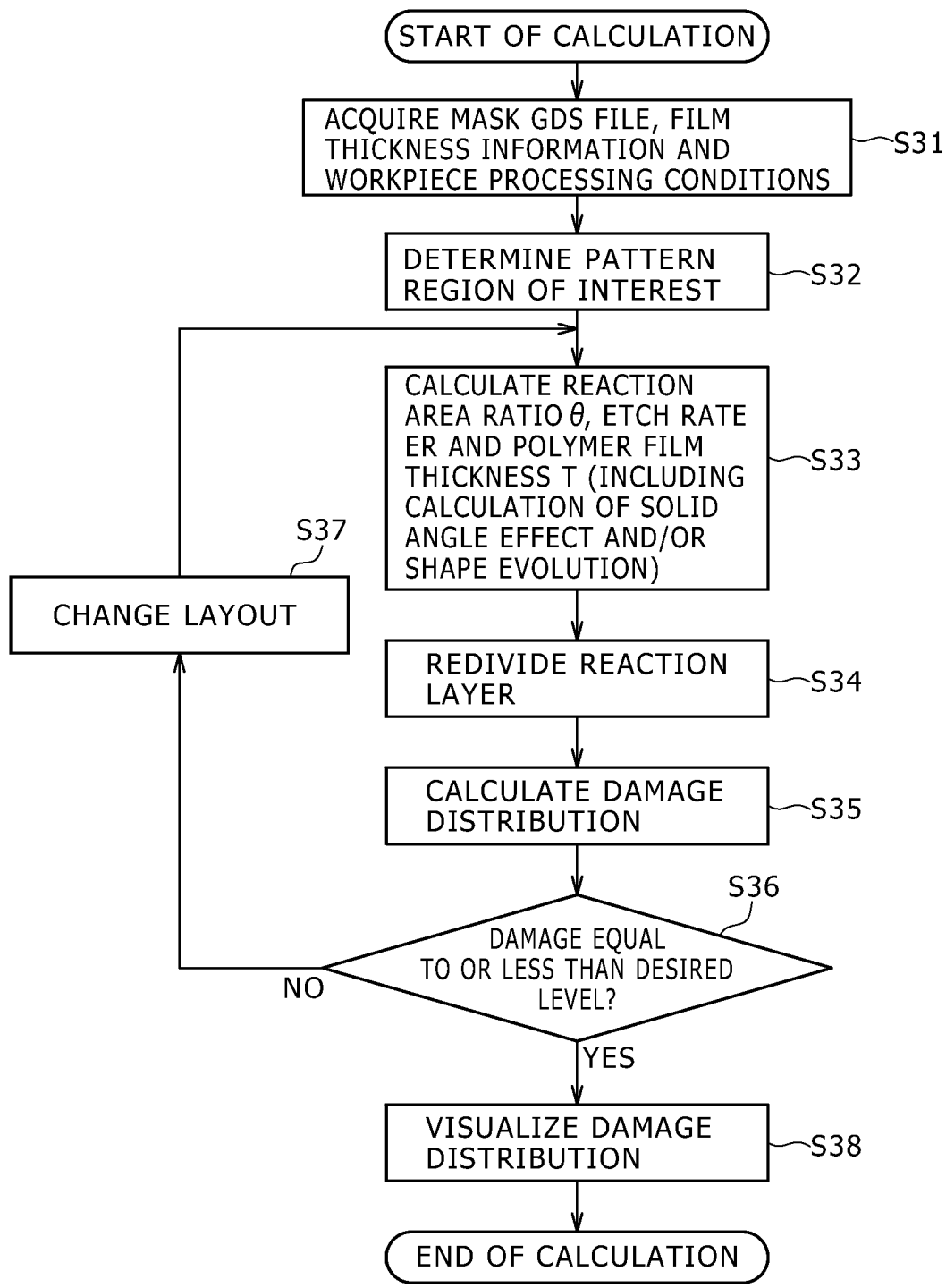
FIG. 26 is a flowchart illustrating the procedure for setting a mask pattern in a mask pattern layout prediction tool according to a fourth embodiment of the present disclosure.

A description will be given below of the optimization of the mask pattern layout in the present embodiment with reference to FIG. 26. It should be noted that FIG. 26 is a flowchart illustrating the procedure for optimizing the mask pattern layout.

First, the simulator acquires the GDS (Graphic Design System) file (mask information) of the mask, film thickness information (initial value) and processing conditions of the workpiece (step S31).

Next, the simulator determines a desired evaluation pattern region (pattern region of interest) (step S32). It should be noted that this pattern region of interest is determined as appropriate, for example, according to the preference of the user. Further, at this time, the simulator sets at least one evaluation point (lattice point or cell) in the pattern region of interest.

Next, the simulator calculates the reaction area ratio $\theta_k(t)$ of each of the slabs 21b at each of the evaluation points in the pattern region of interest of the workpiece, the etch rate ER(t) of the reactive layer and the polymer film thickness T (step S33).

At this time, if the simulator according to the second embodiment is used as a simulator, an assumption is made as to the mask shape (processing depth and taper angles of the side wall surfaces) after a simplified process in the pattern region of interest. Then, the damage calculation section calculates, based on the assumed conditions, the solid angle distribution (distribution characteristic of the solid angle effect) at each of the evaluation points in the pattern region of interest. Next, the damage calculation section calculates the reaction area ratio $\theta_k(t)$, etch rate ER and polymer film thickness T at each of the evaluation points using the fluxes Γ of various reaction particles factoring in the calculated solid angle effect in the same manner as in the second embodiment.

On the other hand, when the simulation system according to the third embodiment is used as a simulator, the reaction area ratio $\theta_k(t)$, etch rate ER and polymer film thickness T at each of the evaluation points are calculated while at the same time calculating the shape evolution of the pattern region of interest in the same manner as in the third embodiment.

Further, when a simulator combining the simulator according to the third embodiment and the solid angle effect calculation described in the second embodiment is used, the various evaluation parameters at the evaluation points are calculated as follows. First, the simulator calculates the solid angle distribution (distribution characteristic of the solid angle effect) at each of the evaluation points in the pattern region of interest in the same manner as in the second embodiment. Next, the simulator calculates the various evaluation parameters at each of the evaluation points in the pattern region of interest by using the fluxes Γ of various reaction particles factoring in the solid angle effect while at the same time calculating the shape evolution of the pattern region of interest in the same manner as in the third embodiment.

As described above, after calculating the various evaluation parameters at each of the evaluation points in the pattern region of interest, the damage calculation section redivides the reactive layer into a plurality of slabs at each of the evaluation points in the same manner as in the first embodiment (step S34). At this time, the thickness $L_k^*$ of each of the slabs after the redivision is calculated by using Formula (13) shown above described in the first embodiment.

Next, the damage calculation section calculates the damage level of each of the slabs at each of the evaluation points in the pattern region of interest, thus finding the damage distribution at each of the evaluation points (step S35). At this time, the damage calculation section calculates the damage level (damage(k)) of each of the slabs by using Formula (14) shown above described in the first embodiment.

Next, the damage calculation section determines whether the damage level of the pattern region of interest calculated in step S35 is equal to or less than the desired damage level (step S36). It should be noted that the desired damage level serving as a threshold in step S36 is set as appropriate, for example, according to the application. Further, this desired damage level information is set in advance and stored, for example, in the database section of the simulator.

If the damage level of the pattern region of interest calculated in step S35 is greater than the desired damage level in step S36, the determination in step S36 is No. In this case, the simulator changes (corrects) the layout pattern shape of the mask (e.g., film thickness, taper angles and pattern-to-pattern spacing) (step S37).

It should be noted that, at this time, the range of pattern change per layout change (e.g., ±50% of the film thickness, ±5% of the taper angles and ±100% of the pattern-to-pattern spacing) may be set in advance so that the mask layout pattern is changed gradually according to this range of change. Alternatively, the mask layout pattern may be changed to a desired extent every layout change.

Then, after changing the mask layout pattern in step S37, the simulator returns to step S33. Then, the simulator performs steps S33 to S35 again to calculate the damage level of the pattern region of interest using the changed layout pattern. The process steps from steps S33 to S37 are repeated until the damage level of the pattern region of interest falls to the desired damage level or less.

On the other hand, when the damage level of the pattern region of interest calculated in step S35 is equal to or less than the desired damage level in step S36, the determination in step S36 is Yes. In this case, the output section of the simulator visualizes the calculated damage distribution of the pattern region of interest (step S38). At this time, the output section may display the evaluation results, for example, on a display device or print the displayed evaluation results. After the visualization of the damage distribution of the pattern region of interest, the simulator terminates the optimization of the mask layout pattern.

By setting a mask pattern layout as described above, it is possible to automatically extract a pattern layout that can bring the damage level of the evaluated pattern down to a given level or less and suppress the spatial variation in damage level (provide improved damage uniformity).

Further, in the present embodiment, the damage distribution is evaluated (predicted) while at the same time changing the shape of the resist formed around the evaluation points of the workpiece. As a result, the present embodiment ensures optimal OPC (Optical Proximity Correction) in consideration of both the resist shape and damage reduction.

Still further, in the present embodiment, the damage distribution of a workpiece is calculated using the Flux method as in the first embodiment, thus providing quick setting of a mask pattern layout.

<5. Fifth Embodiment>

The simulators (simulation systems) according to the first to third embodiments calculate the damage distribution of a workpiece using the Flux method, thus allowing for quicker calculation of the damage distribution of a workpiece. Therefore, if the simulator (simulation system) according to one of the first to third embodiments is incorporated, for example, in an etcher or other processing system, it is possible to evaluate (predict) and control the damage distribution of the workpiece at any time during the process.

For this reason, in the fifth embodiment, a description will be given of an example in which a dry etcher is used as a processing system and the simulation system described in the third embodiment is incorporated in the dry etcher.

[Configuration of the Dry Etcher]

Figure 27:
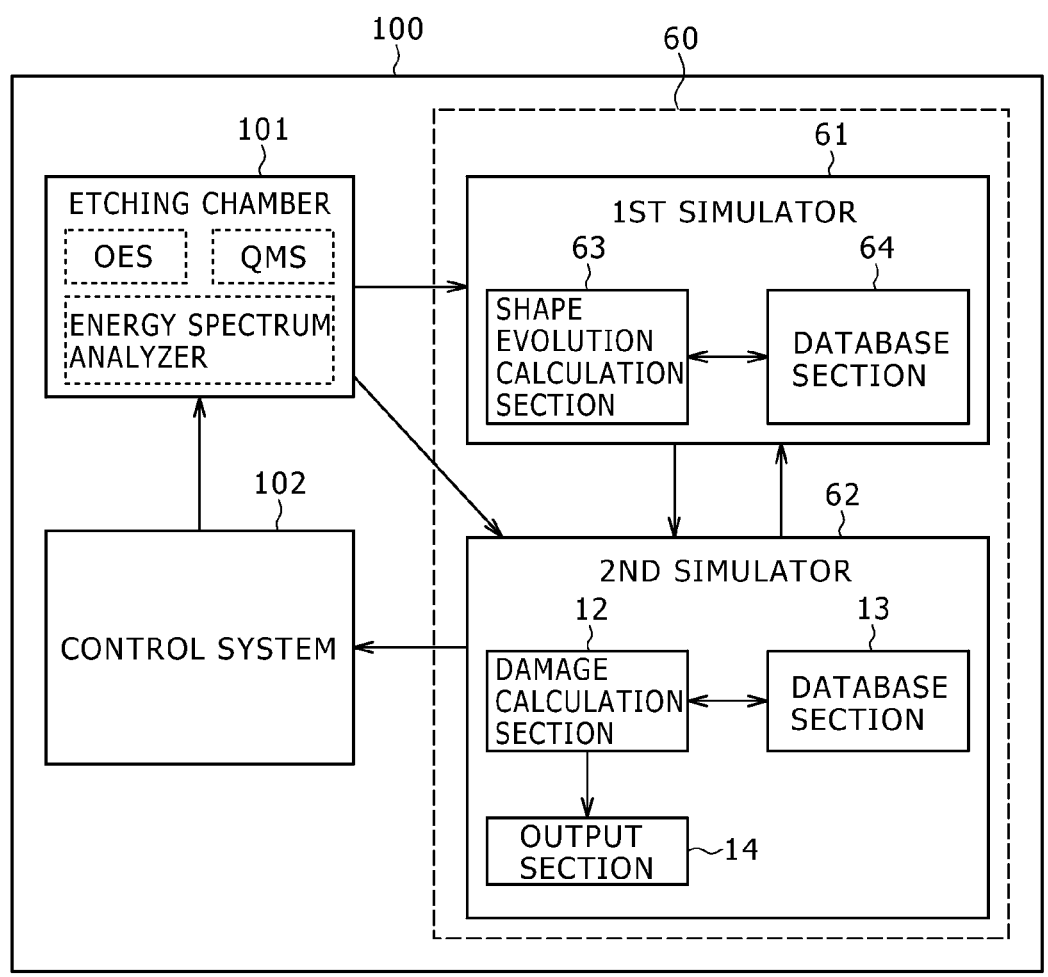
FIG. 27 is a schematic block configuration diagram of a dry etcher according to a fifth embodiment of the present disclosure.

FIG. 27 illustrates the schematic block configuration of the dry etcher according to the present embodiment. A dry etcher 100 (processing system) includes an etching chamber 101 (processing section), control system 102 (control section) and the simulation system 60 (simulator). It should be noted that the input section 11 is not shown in the second simulator 62 in FIG. 27 to facilitate the description.

The etching chamber 101 can include, for example, a CCP, ICP (Inductive Coupled Plasma) or ECR (Electron Cyclotron Resonance) chamber. On the other hand, an optical emission spectrometer OES, mass spectrometer QMS and energy spectrum analyzer are installed in the etching chamber 101.

It should be noted that the optical emission spectrometer OES and mass spectrometer QMS monitor the fluxes $\Gamma$ of various reaction particles (reaction gases) that vary depending on the condition in the etching chamber 101. On the other hand, the energy spectrum analyzer measures the incident ion energy E.

Further, the condition in the etching chamber 101 is monitored by the optical emission spectrometer OES, mass spectrometer QMS and energy spectrum analyzer at given time intervals (e.g., every second) while the workpiece is processed. It should be noted that these monitoring time intervals should preferably be equal to the calculation step $\Delta t$ used by the simulation system 60 to calculate the damage distribution or less.

Still further, the etching chamber 101 is electrically connected to the simulation system 60, outputting various pieces of information (e.g., fluxes and incident ion energy) indicating the monitored condition in the chamber to the simulation system 60.

The control system 102 corrects the various process parameters (e.g., gas flow rate, gas pressure, wafer temperature, etching time) of the etching chamber 101 based on the damage distribution calculation results supplied from the simulation system 60. Further, the control system 102 is electrically connected to the etching chamber 101, outputting the various corrected process parameters to the etching chamber 101 and controlling the etching conditions.

The simulation system 60 is configured in the same manner as the simulation system described in the third embodiment (FIG. 24). Therefore, the description of each of the sections of the simulation system 60 will be omitted.

The simulation system 60 calculates the shape evolution and damage distribution of the workpiece by using the various pieces of monitoring information from the etching chamber 101 in the same manner as in the third embodiment. Further, the simulation system 60 is electrically connected to the control system 102, outputting the calculated damage distribution to the control system 102.

It should be noted that, in the present embodiment, the acquisition method of the fluxes $\Gamma$ of various reaction particles is not limited to that described above (acquisition of monitored values). For example, only various process conditions (e.g., gas flow rate, gas pressure, wafer temperature, etching time) may be acquired from the etching chamber 101 so that the damage calculation section 12 calculates, based on these pieces of information, the fluxes $\Gamma$ of various reaction particles.

Alternatively, the fluxes $\Gamma$ of various reaction particles corresponding to various process conditions may be stored in advance in the database section 13 so that the damage calculation section 12 acquires the corresponding fluxes $\Gamma$ by searching the database section 13 based on the supplied process conditions. It should be noted, however, that if the fluxes $\Gamma$ corresponding to the supplied process conditions are not available in the database section 13, the damage calculation section 12 may calculate the corresponding fluxes $\Gamma$ of various reaction particles by interpolating the data obtained under the conditions close to the supplied process conditions.

If the fluxes $\Gamma$ of various reaction particles are acquired in the manner as described above, it is not necessary to provide any device adapted to monitor the fluxes $\Gamma$ of various reaction particles in the etching chamber 101.

[Etching Control Method]

Figure 28:
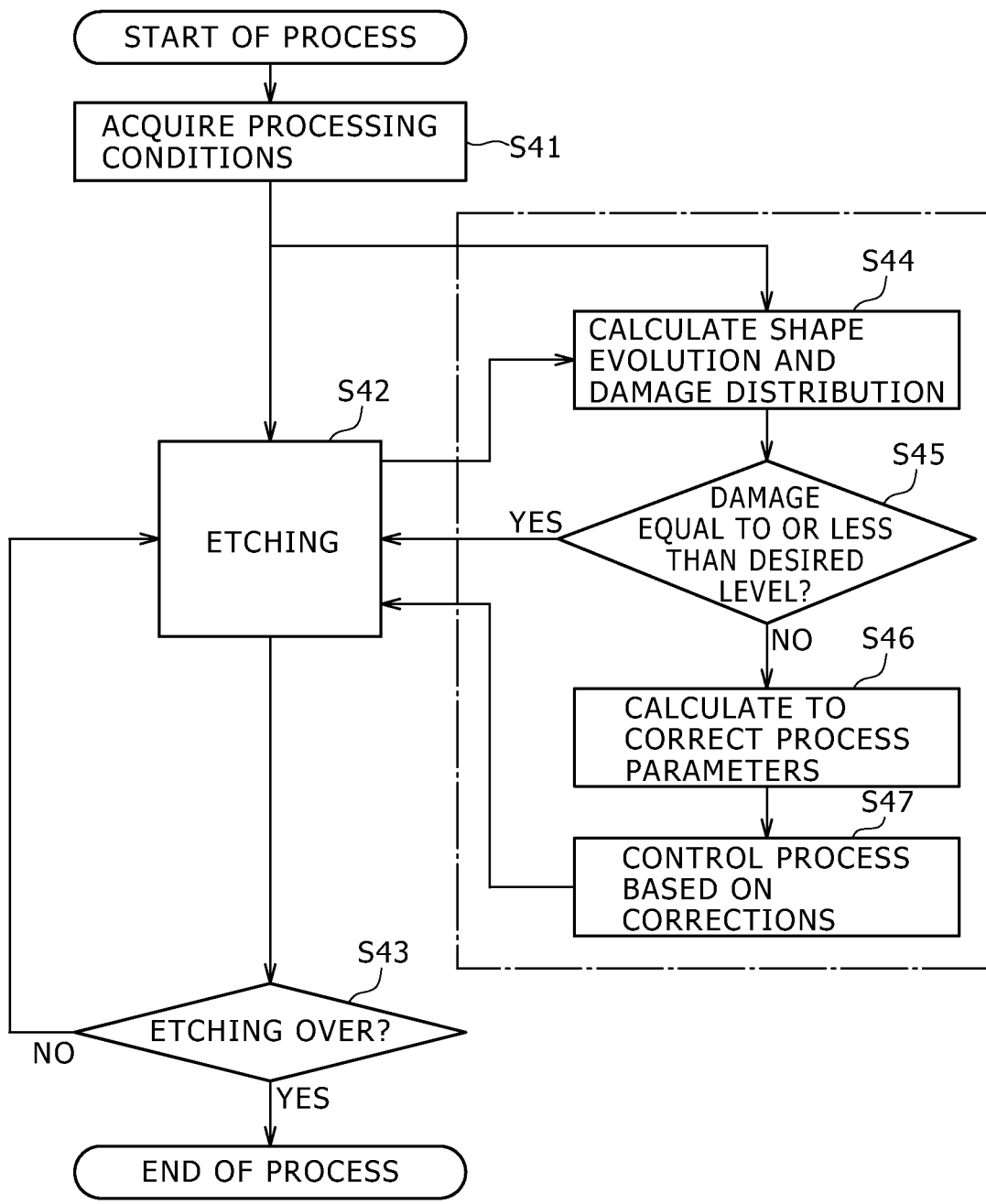
FIG. 28 is a flowchart for describing the etching control method of the dry etcher according to the fifth embodiment.

A description will be given next of the etching control method of the dry etcher 100 according to the present embodiment with reference to FIG. 28. It should be noted that FIG. 28 is a flowchart illustrating the procedure for controlling etching according to the present embodiment.

First, the dry etcher 100 acquires various externally supplied processing conditions (process conditions and initial conditions of various calculation parameters) (step S41). At this time, the process conditions such as gas type, gas flow rate, gas pressure, wafer temperature and etching time are supplied to the etching chamber 101. On the other hand, the calculation parameters necessary for the damage calculations such as the material of the workpiece, initial shape of the surface to be processed, initial thickness L of the slabs, initial polymer film thickness T and maximum penetration depth Dp of the ion particle are supplied to the simulation system 60.

Next, the etching chamber 101 performs etching based on the process conditions acquired in step S41 or the process parameters corrected by the control system 102 (step S42). At this time, the etching chamber 101 monitors information indicating the condition in the chamber such as the fluxes $\Gamma$ of various reaction particles (reaction gases) and the incident ion energy at given time intervals (e.g., every second), outputting the various pieces of monitoring information to the simulation system 60.

Next, the dry etcher 100 determines whether to terminate the etching (step S43). More specifically, the dry etcher 100 determines whether the elapsed time from the beginning of the etching has reached the etching time.

If the elapsed time from the beginning of the etching has yet to reach the etching time in step S43, the determination in step S43 is No. In this case, the dry etcher 100 continues with the etching in step S42. On the other hand, when the elapsed time from the beginning of the etching has reached the etching time in step S43, the determination in step S43 is Yes. In this case, the dry etcher 100 terminates the etching.

A description will be given here of the etching process control performed during etching in step S42 (part of the flowchart enclosed by a long dashed short dashed line in FIG. 28).

First, the simulation system 60 calculates the shape evolution and damage distribution of the workpiece based on the various calculation parameters acquired in step S41 and the various pieces of monitoring information supplied from the etching chamber 101 (step S44).

At this time, the simulation system 60 calculates the shape evolution (change in shape of the surface to be processed) and damage distribution of the workpiece in the same manner as in the third embodiment. Then, the simulation system 60 outputs the simulation results to the control system 102.

Next, the control system 102 determines whether the damage level of the workpiece calculated by the simulation system 60 is equal to or less than the desired damage level (step S45).

When the damage level of the workpiece calculated by the simulation system 60 is equal to or less than the desired damage level in step S45, the determination in step S45 is Yes. In this case, the control system 102 outputs a signal to the etching chamber 101 to inform that the various process parameters will not be corrected.

On the other hand, if the damage level of the workpiece calculated by the simulation system 60 is not equal to or less than the desired damage level in step S45, the determination in step S45 is No. In this case, the control system 102 calculates the correction of the various process parameters in such a manner as to reduce the damage level of the workpiece (step S46).

Next, the control system 102 outputs the various corrected process parameters to the etching chamber 101, thus controlling the etching conditions (step S47). In the present embodiment, the etching is controlled based on the calculation results of the simulation system 60.

As described above, in the present embodiment, the simulation system 60 adapted to calculate the damage distribution of the workpiece by using the Flux method is incorporated in the dry etcher 100, thus making it possible to evaluate (predict) and control the damage distribution of the workpiece at any time during the process. This contributes to improved yield of the workpiece in the production line.

It should be noted that, in the present embodiment, the dry etcher 100 may have, for example, an alarm system such as an FDC (Fault Detection and Classification)/EES (Equipment Engineering System) system. This makes it possible to sound an alarm and stop the dry etcher 100 if the damage level calculated by the simulation system 60 at given time intervals (e.g., every second) exceeds the specification level set by the FDC.

Further, although an example was described in the present embodiment in which the simulation system 60 described in the third embodiment is incorporated in the dry etcher 100, the present disclosure is not limited thereto. For example, the simulator described in the first or second embodiment can also be incorporated in the dry etcher 100, thus providing the same advantageous effect.

6. <Sixth Embodiment>

Although examples were described in the above embodiments in which the damage calculation section 12 directly calculates the damage distribution of the workpiece based on the supplied processing conditions, the present disclosure is not limited thereto. Damage data calculated by the simulator according to any one of the embodiments under various processing conditions may be stored in advance in the database section 13 so that the damage is evaluated by using the stored damage data.

That is, damage data calculated by using the Flux method under various processing conditions may be archived in the form of a database so as to predict (evaluate) the damage sustained by the workpiece using the data in the database. A description will be given in the sixth embodiment of a configuration example thereof.

The simulator (simulation system) according to the sixth embodiment is configured in the same manner as the simulator according to any one of the above embodiments (refer, for example, to FIG. 1 or 24). It should be noted, however, that the damage calculation section 12 according to the present embodiment acquires (calculates) the damage as follows unlike the counterpart according to any one of the above embodiments.

First, the damage calculation section 12 acquires the various processing conditions (e.g., the material of the workpiece, gas type, gas pressure, gas flow rate, temperature of the workpiece and processing time) supplied via the input section 11. Next, the damage calculation section 12 searches the database section 13 based on the acquired processing conditions, thus acquiring the damage data corresponding to the processing conditions. Then, the damage calculation section 12 outputs the acquired damage data to the output section 14.

It should be noted that if the damage data corresponding to the processing conditions is not available in the database section 13, the damage calculation section 12 can, for example, calculate the damage data corresponding to the processing conditions as follows. In this case, the damage calculation section 12 acquires the damage data obtained under the conditions close to the supplied process conditions from the database section 13. Then, the damage calculation section 12 interpolates the acquired data, thus calculating the damage data corresponding to the supplied processing conditions.

As described above, the simulator according to the present embodiment predicts (evaluates) the damage sustained by the workpiece using a damage database prepared in advance, thus providing even faster prediction (evaluation) of the damage sustained by the workpiece. It should be noted that the simulator according to the present embodiment can be used alone as with the simulators described in the first to fourth embodiments. However, the simulator according to the present embodiment can be incorporated in an etcher or other processing system as in the fifth embodiment.

In the above embodiments, a description was given of the simulators (simulation systems) and damage evaluation methods for evaluating the damage sustained by a workpiece subjected to dry etching. However, the present disclosure is not limited thereto.

The simulators and damage evaluation methods according to the above embodiments are applicable to any process achieved as a result of the injection of ion particles or other reaction particles (e.g., PVD, ion implantation or other process), thus providing the same advantageous effect. Further, the processing system incorporating the simulator according to one of the above embodiments is not limited to a dry etcher. Instead, the simulator according to one of the above embodiments can be incorporated in any processing system designed to perform a process as a result of injection of reaction particles, thus providing the same advantageous effect.

It should be noted that if the process to which the simulator and damage evaluation method according to one of the above embodiments are applied changes, the reaction model of the surface to be processed also changes. In this case, therefore, it is necessary to change the reaction model as appropriate according to the new process. In this case, however, the damage calculation algorithm described in the above embodiments can be used as-is.

The present disclosure contains subject matter related to that disclosed in Japanese Priority Patent Application JP 2010-284130 filed in the Japan Patent Office on Dec. 21, 2010, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A simulator for estimating damage data of a workpiece comprising:
a processor operable to:
acquire processing conditions from an external device, for a process performed on the workpiece; and estimate the damage data of the workpiece based on the processing conditions, by calculating, a relationship between an amount of flux of a first substance externally injected onto an evaluation point on the workpiece during the process and an amount of flux of a second substance released from the evaluation point on the workpiece as a result of the injection of the first substance, wherein the processor sets, on the workpiece, a reactive layer of a predetermined depth divided into a plurality of slabs each having a predetermined thickness to calculate the relationship, wherein the processor is operable to calculate the relationship between the amount of flux of the first substance and the amount of flux of the second substance in each of the plurality of slabs; and
a display device operable to display a distribution of the estimated damage data of the workpiece.

2. The simulator of claim 1, wherein the processor is operable to calculate the damage of the workpiece based on the processing conditions by using a Flux method.

3. The simulator of claim 1, wherein the processor is operable to calculate a contribution rate of each of the plurality of slabs in the process, recalculate thicknesses of corresponding slabs of the plurality of slabs based on the calculated contribution rate, and sum up the recalculated thicknesses of the plurality of slabs and reaction area ratios of the corresponding slabs so as to calculate the damage of the plurality of slabs.

4. The simulator of claim 1, wherein the process is etching.

5. The simulator of claim 1, wherein the processor is operable to calculate a solid angle corresponding to a field-of-view region including a line of sight from the evaluation point to a side of injection of the first substance so as to correct the amount of flux of the first substance injected onto the evaluation point based on the calculated solid angle.

6. The simulator of claim 1, wherein the processor is operable to calculate a shape of a surface of the workpiece to be processed that changes as a result of the process.

7. The simulator of claim 1, wherein the processor is operable to store the estimated damage data of the workpiece estimated by calculating the relationship between the amounts of flux of the first and second substances under the processing conditions of the process, wherein the processor is operable to search the stored damage data based on the processing conditions so as to estimate the damage data corresponding to the processing conditions.

8. The simulator of claim 1, wherein the processor is operable to acquire initial values of shape data of a mask layout pattern to be formed on the workpiece, estimate the damage data of the workpiece with the mask layout pattern formed thereon, and correct the shape data of the mask layout pattern based on the estimated damage data.

9. A processing system for estimating damage data of a workpiece comprising:
a processor operable to:
acquire processing conditions from an external device, for a process performed on the workpiece;
estimate the damage data of the workpiece based on the processing conditions, by calculating, a relationship between an amount of flux of a first substance externally injected onto an evaluation point on the workpiece during the process and an amount of flux of a second substance released from the evaluation point on the workpiece as a result of the injection of the first substance, wherein the processor sets, on the workpiece, a reactive layer of a predetermined depth divided into a plurality of slabs each having a predetermined thickness to calculate the relationship, wherein the processor is operable to calculate the relationship between the amount of flux of the first substance and the amount of flux of the second substance in each of the plurality of slabs; and
correct the processing conditions for the process based on the estimated damage data of the workpiece; and
a display device operable to:
display a distribution of the estimated damage data of the workpiece.

10. The processing system of claim 9, wherein the processor is operable to calculate a contribution rate of each of the plurality of slabs in the process, recalculate thickness of corresponding slabs based on the calculated contribution rate, and add the recalculated thicknesses of the plurality of slabs and reaction area ratios of the corresponding slabs so as to calculate the damage of the plurality of slabs.

11. The processing system of claim 9, wherein the processor is operable to calculate a solid angle corresponding to a field-of-view region having a line of sight from the evaluation point to a side of injection of the first substance so as to correct the amount of flux of the first substance injected onto the evaluation point based on the calculated solid angle.

12. The processing system of claim 9, wherein the processor is operable to calculate a shape of a surface of the workpiece to be processed that changes as a result of the process.

13. The processing system of claim 9, wherein the processor is operable to store the estimated damage data of the workpiece, and search the stored damage data based on the processing conditions acquired so as to estimate the damage data corresponding to the processing conditions.

14. The processing system of claim 9, wherein the processor is operable to acquire initial values of shape data of a mask layout pattern to be formed on the workpiece, estimate the damage data of the workpiece with the mask layout pattern formed thereon, and correct the shape data of the mask layout pattern based on the estimated damage data.

15. A damage evaluation method for estimating damage data of a workpiece comprising:
acquiring from an external device, by a processor, processing conditions for a process performed on the workpiece;
estimating, by the processor, the damage data of the workpiece based on the processing conditions by calculating a relationship between an amount of flux of a first substance externally injected onto an evaluation point on the workpiece during the process and an amount of flux of a second substance released from the evaluation point on the workpiece as a result of the injection of the first substance, wherein a reactive layer of a predetermined depth is set on the workpiece to calculate the relationship, the reactive layer divided into a plurality of slabs each having a predetermined thickness, wherein the relationship is calculated between the amount of flux of the first substance and the amount of flux of the second substance in each of the plurality of slabs; and
displaying, by a display device, a distribution of the estimated damage data of the workpiece.

16. A non-transitory computer-readable medium, having stored thereon, a set of computer-executable instructions that causes a computer to perform the steps for estimating damage data of a workpiece comprising:
acquiring processing conditions from an external device, for a process performed on the workpiece;
estimating the damage data of the workpiece based on the processing conditions by calculating a relationship between an amount of flux of a first substance externally injected onto an evaluation point on the workpiece during the process and an amount of flux of a second substance released from the evaluation point on the workpiece as a result of the injection of the first substance, wherein a reactive layer of a predetermined depth is set on the workpiece to calculate the relationship, the reactive layer divided into a plurality of slabs each having a predetermined thickness, wherein the relationship is calculated between the amount of the flux of the first substance and the amount of flux of the second substance in each of the plurality of slabs; and displaying a distribution of the estimated damage data of the workpiece.

17. A simulator for estimating damage data of a workpiece comprising:

an input section, implemented by computer hardware, adapted to acquire processing conditions externally, for a process performed on the workpiece;

a damage calculation section, implemented by the computer hardware, adapted to estimate the damage data of the workpiece based on the processing conditions, by calculating, using a Flux method, a relationship between an amount of a first substance externally injected onto an evaluation point on the workpiece during the process and an amount of a second substance released from the evaluation point on the workpiece as a result of the injection of the first substance, wherein the damage calculation section sets, on the evaluation point on the workpiece, a reactive layer of a predetermined depth divided into a plurality of slabs each having a predetermined thickness, and calculates the relationship between amounts of the first and second substances in each of the plurality of slabs by using the Flux method; and a display section operable to display a distribution of the estimated damaged data of the workpiece.

* * * * *